(12) United States Patent
Sengstaken, Jr.

(10) Patent No.: US 10,572,700 B2
(45) Date of Patent: Feb. 25, 2020

(54) WIRELESS ASSET LOCATION TRACKING SYSTEM AND RELATED TECHNIQUES

(71) Applicant: Vypin, LLC, Alpharetta, GA (US)

(72) Inventor: Robert William Sengstaken, Jr., Hollis, NH (US)

(73) Assignee: VYPIN, LLC, Alpharetta, GA (US)

( * ) Notice: Subject to any disclaimer, the term of this patent is extended or adjusted under 35 U.S.C. 154(b) by 0 days.

(21) Appl. No.: 15/497,530

(22) Filed: Apr. 26, 2017

(65) Prior Publication Data

US 2017/0228566 A1  Aug. 10, 2017

Related U.S. Application Data

(63) Continuation-in-part of application No. 14/304,195, filed on Jun. 13, 2014.

(Continued)

(51) Int. Cl.
*G06Q 10/08* (2012.01)
*G06K 7/10* (2006.01)
(Continued)

(52) U.S. Cl.
CPC ..... *G06K 7/10009* (2013.01); *G06Q 10/0833* (2013.01); *G08B 7/06* (2013.01);
(Continued)

(58) Field of Classification Search
CPC .. G06Q 10/08; G06Q 10/087; G06Q 10/0833; G06F 19/3462; G06F 1/3206; G06F 1/3287; G06K 2017/0045; G06K 19/0705; G06K 19/0716; G06K 19/0723; G06K 7/10237; B65D 75/327; B65D 2203/10; B65D 2583/0404; G08B 21/0202; G08B 21/0227; G08B 21/0258; G08B 21/0277; G08B 21/028; G08B 13/1436; G08B 25/00; G08B 25/10; G08B 25/0275; H04W 4/008; H04W 84/20; H04W 24/00
See application file for complete search history.

(56) References Cited

U.S. PATENT DOCUMENTS 4,617,557 A  10/1986 Gordon
4,823,982 A  4/1989 Aten
(Continued)

*Primary Examiner* — Benyam Haile
(74) *Attorney, Agent, or Firm* — Hayes Soloway PC

(57) ABSTRACT

A wireless asset location tracking system and related techniques are disclosed. The system may include one or more beacon tags and one or more micro-zone (mZone) transmitters disposed at designated locations. A given mZone transmitter may transmit an mZone signal including data pertaining to its identity, and thus location. A given beacon tag receiving the mZone signal may pull mZone identification data therefrom and relay it in its own beacon signal, along with other data. In this manner, a given mZone transmitter may provide information pertaining to the location within the host space of a given beacon tag within its transmission range. The beacon signal may be received by any gateway or reader device within range, and information therefrom may be delivered through the internet to a server database. The information stored at the server database may be accessed to monitor and track tagged assets and control overall system operation.

20 Claims, 8 Drawing Sheets

Related U.S. Application Data

(60) Provisional application No. 62/327,976, filed on Apr. 26, 2016, provisional application No. 62/328,049, filed on Apr. 27, 2016, provisional application No. 61/839,561, filed on Jun. 26, 2013, provisional application No. 61/902,316, filed on Nov. 11, 2013, provisional application No. 61/902,325, filed on Nov. 11, 2013, provisional application No. 61/974,770, filed on Apr. 3, 2014.

(51) Int. Cl.
*G08B 7/06* (2006.01)
*H04W 52/38* (2009.01)
*G08B 21/02* (2006.01)
*G08B 13/14* (2006.01)
*H04W 88/16* (2009.01)
*G08B 25/10* (2006.01)

(52) U.S. Cl.
CPC ..... *G08B 13/1436* (2013.01); *G08B 21/0227* (2013.01); *H04W 52/38* (2013.01); *G06Q 10/08* (2013.01); *G08B 21/028* (2013.01); *G08B 21/0258* (2013.01); *G08B 21/0275* (2013.01); *G08B 25/10* (2013.01); *H04W 88/16* (2013.01)

(56) References Cited

U.S. PATENT DOCUMENTS

| | | |
|---|---|---|
| 4,922,433 A | 5/1990 | Mark |
| 5,014,851 A | 5/1991 | Wick |
| 5,323,907 A | 6/1994 | Kalvelage |
| 5,412,372 A | 5/1995 | Parkhurst et al. |
| 5,791,478 A | 8/1998 | Kalvelage et al. |
| 5,852,590 A | 12/1998 | de la Huerga |
| 5,990,647 A | 11/1999 | Zettler |
| 6,052,093 A | 4/2000 | Yao et al. |
| 6,058,374 A | 5/2000 | Guthrie et al. |
| 6,188,678 B1 | 2/2001 | Prescott |
| 6,244,462 B1 | 6/2001 | Ehrensvard et al. |
| 6,310,555 B1 | 10/2001 | Stern |
| 6,325,066 B1 | 12/2001 | Hughes et al. |
| 6,411,567 B1 | 6/2002 | Niemiec |
| 6,542,114 B1 | 4/2003 | Eagleson et al. |
| 6,574,166 B2 | 6/2003 | Niemiec |
| 6,720,888 B2 | 4/2004 | Eagleson et al. |
| 7,113,101 B2 | 9/2006 | Peterson et al. |
| 7,142,123 B1 | 11/2006 | Kates |
| 7,221,280 B2 | 5/2007 | Hsieh |
| 7,263,875 B2 | 9/2007 | Hawk |
| 7,352,286 B2 | 4/2008 | Chan et al. |
| 7,394,381 B2 | 7/2008 | Hanson et al. |
| 7,414,571 B2 | 8/2008 | Schantz et al. |
| 7,541,942 B2 | 6/2009 | Cargonja et al. |
| 7,688,206 B2 | 3/2010 | Carrender |
| 7,768,393 B2 | 8/2010 | Nigam |
| 7,937,167 B1* | 5/2011 | Mesarina ............ H04W 8/186 340/870.11 |
| 7,937,829 B2 | 5/2011 | Peterson et al. |
| 7,940,173 B2 | 5/2011 | Koen |
| 7,944,350 B2 | 5/2011 | Culpepper et al. |
| 7,956,746 B2 | 6/2011 | Truscott et al. |
| 8,025,149 B2 | 9/2011 | Sterry et al. |
| 8,026,814 B1 | 9/2011 | Heinze et al. |
| 8,085,135 B2 | 12/2011 | Cohen Alloro et al. |
| 8,102,271 B2 | 1/2012 | Heo et al. |
| 8,125,339 B2 | 2/2012 | Neuwirth |
| 8,193,918 B1 | 6/2012 | Shavelsky et al. |
| 8,279,076 B2 | 10/2012 | Johnson |
| 8,334,773 B2 | 12/2012 | Cova et al. |
| 8,339,244 B2 | 12/2012 | Peden, II et al. |
| 8,351,546 B2 | 1/2013 | Vitek |
| 8,373,562 B1 | 2/2013 | Heinze et al. |
| 8,384,542 B1 | 2/2013 | Merrill et al. |
| 8,395,496 B2 | 3/2013 | Joshi et al. |
| 8,432,274 B2 | 4/2013 | Cova et al. |
| 8,471,715 B2 | 6/2013 | Solazzo et al. |
| 8,487,757 B2 | 7/2013 | Culpepper et al. |
| 8,494,581 B2 | 7/2013 | Barbosa et al. |
| 8,514,082 B2 | 8/2013 | Cova et al. |
| 8,515,389 B2 | 8/2013 | Smetters et al. |
| 8,526,884 B1 | 9/2013 | Price et al. |
| 8,532,718 B2 | 9/2013 | Behzad et al. |
| 8,548,623 B2 | 10/2013 | Poutiatine et al. |
| 8,889,944 B2 | 11/2014 | Abraham et al. |
| 8,960,440 B1 | 2/2015 | Kronberg |
| 8,962,909 B2 | 2/2015 | Groosman et al. |
| 9,102,388 B2 | 8/2015 | Lee et al. |
| 2002/0017996 A1 | 2/2002 | Niemiec |
| 2002/0135479 A1 | 9/2002 | Belcher et al. |
| 2003/0007421 A1 | 1/2003 | Niemiec et al. |
| 2003/0020615 A1 | 1/2003 | Zand et al. |
| 2003/0036354 A1 | 2/2003 | Lee et al. |
| 2003/0090387 A1 | 5/2003 | Lestienne et al. |
| 2004/0000571 A1 | 1/2004 | Reiserer |
| 2004/0066302 A1 | 4/2004 | Menard et al. |
| 2005/0052315 A1 | 3/2005 | Winterling et al. |
| 2005/0115308 A1 | 6/2005 | Koram et al. |
| 2005/0237198 A1 | 10/2005 | Waldner et al. |
| 2005/0266808 A1 | 12/2005 | Reunamaki et al. |
| 2005/0284789 A1 | 12/2005 | Carespodi |
| 2006/0047480 A1 | 3/2006 | Lenz et al. |
| 2006/0092031 A1 | 5/2006 | Vokey et al. |
| 2006/0132301 A1 | 6/2006 | Stilp |
| 2006/0202830 A1 | 9/2006 | Scharfeld et al. |
| 2006/0218011 A1 | 9/2006 | Walker et al. |
| 2006/0249401 A1 | 11/2006 | Lehmann et al. |
| 2007/0044542 A1 | 3/2007 | Barguirdjian et al. |
| 2007/0046481 A1 | 3/2007 | Vokey et al. |
| 2007/0097792 A1 | 5/2007 | Burrows et al. |
| 2007/0211768 A1 | 9/2007 | Cornwall et al. |
| 2008/0053040 A1 | 3/2008 | Petersen et al. |
| 2008/0068217 A1 | 3/2008 | Van Wyk et al. |
| 2008/0300559 A1 | 12/2008 | Gustafson et al. |
| 2009/0295572 A1 | 12/2009 | Grim, III et al. |
| 2010/0018155 A1 | 1/2010 | Forst et al. |
| 2010/0117836 A1 | 5/2010 | Seyed Momen et al. |
| 2010/0182131 A1 | 7/2010 | Balthes et al. |
| 2010/0304091 A1 | 12/2010 | Wang |
| 2011/0028308 A1 | 2/2011 | Shah et al. |
| 2011/0030875 A1* | 2/2011 | Conte ................ G01V 15/00 156/64 |
| 2011/0068892 A1* | 3/2011 | Perkins ............... G06Q 10/08 340/5.2 |
| 2011/0077909 A1 | 3/2011 | Gregory et al. |
| 2011/0100862 A1 | 5/2011 | Turkington et al. |
| 2011/0105955 A1 | 5/2011 | Yudovsky et al. |
| 2011/0128129 A1 | 6/2011 | Graczyk et al. |
| 2011/0187393 A1 | 8/2011 | Vokey et al. |
| 2011/0227734 A1 | 9/2011 | Ortenzi et al. |
| 2011/0254682 A1 | 10/2011 | Sigrist Christensen |
| 2011/0316674 A1* | 12/2011 | Joy ................. G06Q 10/087 340/10.1 |
| 2012/0154120 A1 | 6/2012 | Alloro et al. |
| 2012/0161942 A1 | 6/2012 | Muellner et al. |
| 2012/0242481 A1* | 9/2012 | Gernandt ......... G06K 19/0705 340/539.13 |
| 2013/0002795 A1 | 1/2013 | Shavelsky et al. |
| 2013/0041623 A1 | 2/2013 | Kumar et al. |
| 2013/0072870 A1 | 3/2013 | Heppe et al. |
| 2013/0150769 A1 | 6/2013 | Heppe |
| 2013/0210347 A1* | 8/2013 | Ling ................. H04W 4/80 455/41.1 |
| 2013/0274663 A1 | 10/2013 | Heppe |
| 2013/0285681 A1 | 10/2013 | Wilson et al. |
| 2014/0026978 A1 | 1/2014 | Savaria |
| 2014/0197531 A1 | 7/2014 | Bolognia |
| 2014/0262918 A1 | 9/2014 | Chu |
| 2014/0266760 A1 | 9/2014 | Burke, Jr. et al. |
| 2014/0145848 A1 | 10/2014 | Amir |
| 2014/0290394 A1 | 10/2014 | Grossman et al. |
| 2014/0354433 A1 | 12/2014 | Buco et al. |

(56) References Cited

U.S. PATENT DOCUMENTS

| | | |
|---|---|---|
| 2015/0002274 A1 | 1/2015 | Sengstaken, Jr. |
| 2015/0091702 A1 | 4/2015 | Gupta et al. |
| 2015/0130637 A1 | 5/2015 | Sengstaken, Jr. |
| 2015/0143881 A1 | 5/2015 | Raut et al. |
| 2015/0148947 A1 | 5/2015 | McConville et al. |
| 2015/0230716 A1 | 8/2015 | Heppe |
| 2016/0274162 A1 | 9/2016 | Freeman et al. |

* cited by examiner

WIRELESS ASSET LOCATION TRACKING SYSTEM AND RELATED TECHNIQUES

CROSS-REFERENCE TO RELATED APPLICATIONS

This patent application claims the benefit of: U.S. Provisional Patent Application No. 62/327,976, titled "Asset Tracking System and Related Methodologies," filed on Apr. 26, 2016; and U.S. Provisional Patent Application No. 62/328,049, titled "Chassis Tracking Apparatus and Related Methods," filed on Apr. 27, 2016. Furthermore, this patent application is a Continuation-in-Part of U.S. patent application Ser. No. 14/304,195, titled "Asset Tag Apparatus and Related Methods," filed on Jun. 13, 2014, which claims the benefit of each of: U.S. Provisional Patent Application No. 61/839,561, titled "BlueTooth Asset and Sensor Tag," filed on Jun. 26, 2013; U.S. Provisional Patent Application No. 61/902,316, titled "Bluetooth Asset Tag Signpost," filed on Nov. 11, 2013; U.S. Provisional Patent Application No. 61/902,325, titled "Bluetooth Stockbin Indicator Tag," filed on Nov. 11, 2013; and U.S. Provisional Patent Application No. 61/974,770, titled "Asset Tag Apparatus and Related Methods," filed on Apr. 3, 2014. Each of these patent applications is herein incorporated by reference in its entirety.

FIELD OF THE DISCLOSURE

The present disclosure relates to asset location tracking and more particularly to a wireless asset location tracking system and related techniques.

BACKGROUND

In wireless asset tracking, assets are typically outfitted with devices that broadcast location information. Global positioning system (GPS)-based tracking devices utilize geolocation data provided by a global navigation satellite system to locate and track assets of interest. Radio-frequency identification (RFID)-based tracking devices utilize a local infrastructure of radio wave transmitters and receivers to locate and track assets of interest.

SUMMARY

The subject matter of this application may involve, in some cases, interrelated products, alternative solutions to a particular problem, and/or a plurality of different uses of a single system or article.

One example embodiment provides a wireless tracking system. The wireless tracking system includes a micro-zone transmitter device configured to transmit a first signal including data pertaining to a unique identifier associated with the micro-zone transmitter device, wherein the first signal is of a frequency in at least one of: a 902 MHz ISM band; a 915 MHz ISM band; an 869 MHz ISM band; and a 433 MHz ISM band. The wireless tracking system also includes a beacon tag device. The beacon tag device includes a wireless receiver configured to receive the first signal including the data pertaining to the unique identifier associated with the micro-zone transmitter device. The beacon tag device further includes a wireless transmitter configured to transmit a second signal of a frequency in an ISM band of between 2.4-2.485 GHz, wherein the second signal includes: data pertaining to a unique identifier associated with the beacon tag device; and the data pertaining to the unique identifier associated with the micro-zone transmitter device. The beacon tag device further includes a motion detection sensor configured to detect at least one of movement of the beacon tag device and an impact to the beacon tag device and, in response thereto, output a wake-up signal causing the wireless transmitter to transmit the second signal external to the beacon tag device. In some cases, the micro-zone transmitter device is further configured to: receive a third signal from a remote source, wherein the third signal is of a frequency in an ISM: band of between 2.4-2.485 GHz; and transmit a fourth signal in response to receipt of the third signal. The fourth signal is of a frequency in at least one of: a 902 MHz ISM band; a 915 MHz ISM band; an 869 MHz ISM band; and a 433 MHz ISM band. Also, the fourth signal includes: a command; and at least one of: data pertaining to the unique identifier associated with the beacon tag device; and data pertaining to at least one of a group identifier and a sub-group identifier associated with the beacon tag device. In some instances: the command is either a location command, a find command, or an alert command; and if the command is the find command, the wireless transmitter of the beacon tag device is further configured to transmit the second signal at least one of at an increased transmission rate and at an increased transmission power in response to the beacon tag device being a target of the find command. In some other instances: the beacon tag device further includes at least one of: an audio output device configured to emit a sound; and an optical output device configured to emit light; the command is either a location command, a find command, or an alert command; and if the command is the find command, the beacon tag device is configured to at least one of: emit the sound via the audio output device in response to the beacon tag device being a target of the find command; and emit light via the optical output device in response to the beacon tag device being a target of the find command. In some cases, the second signal further includes data pertaining to at least one of a group identifier and a sub-group identifier associated with the beacon tag device. In some cases, the second signal further includes data pertaining to at least one of: a status of the beacon tag device; a power level of a power supply of the beacon tag device; and an output of a sensor of the beacon tag device. In some instances, the wireless tracking system further includes a gateway configured to communicate with: the micro-zone transmitter device; the beacon tag device; and a server database.

Another example embodiment provides a beacon tag device. The beacon tag device includes a wireless receiver configured to receive a first signal including data pertaining to a unique identifier associated with a remote source of the first signal. The beacon tag device further includes a wireless transmitter configured to transmit a second signal of a frequency in an ISM band of between 2.4-2.485 GHz, wherein the second signal includes data pertaining to a unique identifier associated with the beacon tag device. The beacon tag device further includes a processor configured to instruct the wireless transmitter to transmit in the second signal the data pertaining to the unique identifier associated with the remote source of the first signal The beacon tag device further includes a motion detection sensor configured to detect at least one of movement of the beacon tag device and an impact to the beacon tag device and, in response thereto, output a wake-up signal to the processor, the wake-up signal causing the processor to transition out of a sleep-state or an off-state, wherein the processor is configured to instruct the wireless transmitter to transmit the second signal in response to receipt of the wake-up signal. In some cases, the first signal is of a frequency in at least one of: a 902 MHz ISM band; a 915 MHz ISM band; an 869 MHz ISM band; and a 433 MHz ISM band. In some instances, the wireless receiver is configured to be, within a one-second period: turned on and able to receive the first signal for a first period of about 1 ms or less; and turned off and unable to receive the first signal for a second period of about 100 ms or less. In some cases, the wireless receiver is further configured to receive a third signal including a command. Also, the third signal includes at least one of: data pertaining to a unique identifier associated with the beacon tag device; and data pertaining to at least one of a group identifier and a sub-group identifier associated with the beacon tag device. In some instances: the command is either a location command, a find command, or an alert command; and if the command is the find command, the processor is further configured to instruct the wireless transmitter to transmit the second signal at least one of at an increased transmission rate and at an increased transmission power in response to the beacon tag device being a target of the find command or the alert command. In some other instances: the beacon tag device further includes at least one of: an audio output device configured to emit a sound; and an optical output device configured to emit light; the command is either a location command, a find command, or an alert command; and if the command is the find command, the processor is further configured to at least one of: instruct the audio output device to emit the sound in response to the beacon tag device being a target of the find command or the alert command; and instruct the optical output device to emit light in response to the beacon tag device being a target of the find command or the alert command. In some cases, the second signal further includes data pertaining to at least one of a group identifier and a sub-group identifier associated with the beacon tag device. In some instances, the second signal further includes data pertaining to at least one of: a status of the beacon tag device; a power level of a power supply of the beacon tag device; and an output of a sensor of the beacon tag device. In some cases: the wireless receiver is further configured to receive a third signal including data pertaining to a unique identifier associated with a remote source of the third signal; and the processor is further configured to instruct the wireless transmitter to transmit in the second signal the data pertaining to the unique identifier associated with the remote source of the third signal. In some instances: the beacon tag device further includes a temperature sensor configured to detect at least one of: an ambient temperature surrounding the beacon tag device; and a temperature of an asset hosting the beacon tag device; and the second signal further includes data pertaining to at least one of: the ambient temperature surrounding the beacon tag device; and the temperature of the asset hosting the beacon tag device. In some cases: the beacon tag device further includes a sensor configured to detect a presence of a shipping container disposed on a chassis hosting the beacon tag device; and the second signal further includes data pertaining to whether the shipping container is disposed on the chassis. In some instances: the beacon tag device further includes a removal detection sensor configured to detect removal of the beacon tag device from a host asset; and the second signal further includes data pertaining to whether the beacon tag device has been removed from the host asset. In some cases, the beacon tag device further includes at least one of: a near-field communication (NFC) device configured to communicate with the processor and at least one of transmit and receive an NFC signal; and a radio frequency identification (RFID) device configured to communicate with the processor and at least one of transmit and receive an RFID signal.

Another example embodiment provides a transmitter device. The transmitter device includes a wireless transmitter configured to transmit a first signal including data pertaining to a unique identifier associated with the transmitter device. The transmitter device further includes a wireless transceiver configured to receive a second signal from a remote source, wherein the second signal is of a frequency in an ISM band of between 2.4-2.485 GHz. The transmitter device further includes a processor configured to instruct the wireless transmitter to: transmit the first signal by default; and in response to receipt of the second signal, transmit instead a third signal. The third signal includes a command. Also, the third signal includes at least one of: data pertaining to a unique identifier associated with a beacon tag device configured to receive the third signal; and data pertaining to at least one of a group identifier and a sub-group identifier associated with the beacon tag device configured to receive the third signal. In some cases, both the first signal and the third signal are of a frequency in at least one of: a 902 MHz ISM hand; a 915 MHz ISM band; an 869 MHz ISM band; and a 433 MHz ISM band. In some instances: the command is either a location command, a find command, or an alert command; and if the command is the find command, the third signal includes data that causes the beacon tag device configured to receive the third signal to at least one of increase a transmission rate and increase a transmission power of a fourth signal transmitted by the beacon tag device in response to the beacon tag device being a target of the find command or the alert command. In some other instances: the command is either a location command, a find command, or an alert command; and if the command is the find command, the third signal includes data that causes the beacon tag device configured to receive the third signal to at least one of emit a sound and emit light in response to the beacon tag device being a target of the find command or the alert command. In some cases, the wireless transmitter is configured to be: turned on an able to transmit either the first signal or the third signal for a first period of about 100 ms or more; and turned off and unable to transmit either the first signal or the third signal for a second period of about 1-2 s. In some instances, the wireless transmitter is configured with a programmable transmission power. In some cases, the wireless transmitter includes an antenna configured for at least one of: omni-directional transmission of either the first signal or the third signal; and directional transmission of either the first signal or the third signal. In some other cases: the antenna is configured for both omni-directional transmission and directional transmission; and the type of transmission is selectable. In some instances: the transmitter device further includes a motion detection sensor configured to detect movement of the transmitter device; and the processor is further configured to instruct the wireless transmitter to transmit in the first signal data pertaining to movement of the transmitter device detected by the motion detection sensor.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
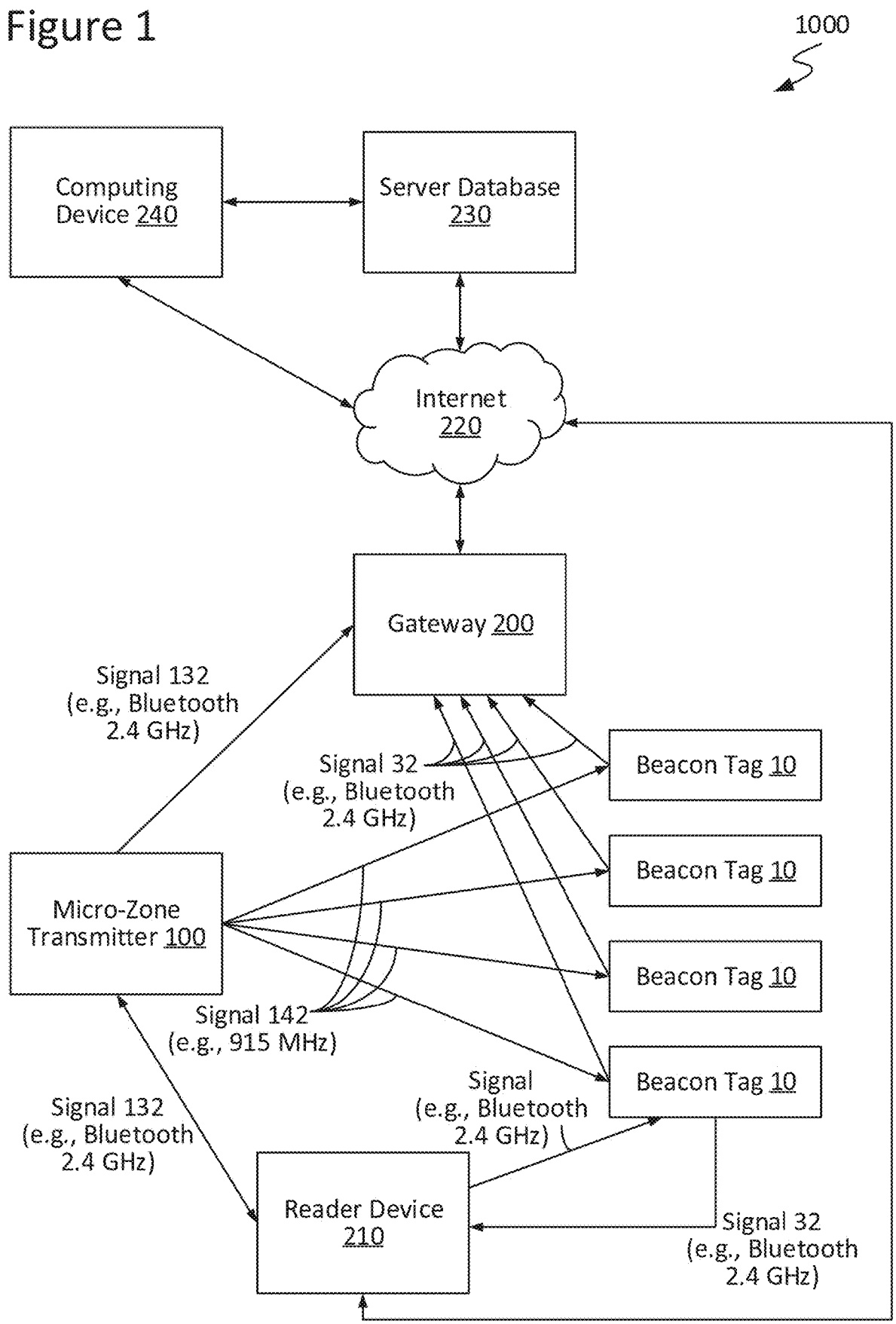
FIG. 1 illustrates a wireless location tracking system configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A wireless asset location tracking system and related techniques are disclosed. The system may include one or more beacon tags hosted by a given quantity of tagged assets and one or more micro-zone (mZone) transmitters disposed at designated locations. A given mZone transmitter may transmit an mZone signal including data pertaining to its identity, and thus location. A given beacon tag may receive the mZone signal and pull mZone identification data therefrom, relaying that mZone identification data in its own beacon signal, along with other data. From this, the location may be inferred based on the fixed location of the source mZone transmitter, as designated when the system is installed. In this manner, a given mZone transmitter may provide information pertaining to the location within the host space of a given beacon tag within its transmission range. The beacon signal may be received by any gateway or reader device within transmission range. When received by a gateway, information from the beacon signal may be delivered through the internet to a server database, which may be cloud-based in some instances. Reader devices and other computing devices may access the information stored at the server database to monitor and track the tagged assets, as well as control overall system operation. Numerous configurations and variations will be apparent in light of this disclosure.

General Overview

Radio-based tracking systems are used in various enterprises and facilities to track movable assets, in effort to provide knowledge of the location of a given asset. With existing approaches, however, installing the infrastructure to enable asset tracking is normally expensive, and the asset tag typically has sufficient power to operate only for a very limited time before its batteries are depleted and the tag stops working. Moreover, the use of global positioning system (GPS)-based devices with cellular communications is an option that is too expensive for widespread use, due to the high cost of the unit, installation costs, and cellular connection fees, and which does not operate sufficiently indoors. Furthermore, the costs of the infrastructure for many conventional tracking systems, including radio-frequency identification (RFID) readers for passive RFID tags, can be prohibitively high to prospective users.

In addition, the battery life of existing devices is severely limited due to several factors. One factor is that existing devices are location-aware, which means they receive signals from infrastructure that are associated with specific locations, and the tags then have to report the location data back to an asset tracking system. These devices also normally use a two-way protocol, which includes sending a message and receiving an acknowledgment of receipt. Having to replace the battery or entirety of these existing devices is an expensive and often time-consuming process. Additionally, it can be difficult to determine the optimal time for replacement of a battery, thereby leaving the user at risk of the tracking device fully losing power and subsequently failing. Some low-power radios have been used to increase battery life, but these devices have shorter transmission range, requiring the RF infrastructure to relay.

Furthermore, in the specific example context of tracking shipping containers and chassis, the need to have a tracking device with sufficient battery power to operate for the life of the chassis, or a substantial portion of the life of the chassis, is a critical factor in industry today. When the assets being tracked are highly mobile, such as in the case of international shipping containers, having an asset tag which no longer functions to track the asset is highly undesirable. Also, the chassis are generally owned by rental companies, which charge a daily fee for their use. With tens of thousands of chassis owned by a single company, the difficulty in keeping daily track of them and charging the daily use fee results in many cases of uncharged fees and lost revenue. Currently, there is no method to determine when a shipping container is placed on the chassis to start charging the fee or to determine which chassis may be sitting idle for a long period of time.

Thus, and in accordance with some embodiments of the present disclosure, a wireless asset location tracking system and related techniques are disclosed. The system may include one or more beacon tags hosted by a given quantity of tagged assets and one or more micro-zone (mZone) transmitters disposed at designated locations. A given mZone transmitter may transmit an mZone signal including data pertaining to its identity, and thus location. A given beacon tag may receive the mZone signal and pull mZone identification data therefrom, relaying that mZone identification data in its own beacon signal, along with other data. From this, the location may be inferred based on the fixed location of the source mZone transmitter, as designated when the system is installed. In this manner, a given mZone transmitter may provide information pertaining to the location within the host space of a given beacon tag within its transmission range. The beacon signal may be received by any gateway or reader device within transmission range. When received by a gateway, information from the beacon signal may be delivered through the internet to a server database, which may be cloud-based in some instances, allowing for inter-networking of the system components and other elements as part of the internet of things (IOT). Reader devices and other computing devices may access the information stored at the server database to monitor and track the tagged assets, as well as control overall system operation.

A given mZone transmitter may provide sufficient general location of the asset tagged with a beacon tag within the transmission range programmed into the mZone transmitter. This location information may be sufficient to locate assets relatively quickly and easily. In this manner, each beacon tag individually may be used to track a single tagged asset, but collectively, a plurality of beacon tags may be used to track multiple tagged assets. Also, as described herein, the disclosed tracking system may provide for a 'Find' function, which may be utilized to locate a specific tagged asset within a given space, such as a large building or outdoor storage area. As further described herein, the disclosed tracking system may provide for an 'Alert' function, which may be utilized to notify of the detected presence and/or movement of a specific tagged asset of interest.

In accordance with some embodiments, a tracking system configured as described herein may be used in tracking any of a wide range of assets in any of a wide range of contexts. For example, in accordance with some embodiments, the disclosed tracking system may be used in tracking personnel, medical equipment, and other assets in the context of a hospital or other facility. In accordance with some embodiments, a tracking system configured as described herein may be used, for example, in tracking shipping containers, chassis, and other assets in the context of a seaport, shipping facility, or other distribution center.

In some cases, an mZone transmitter configured as provided herein may be lower in construction and operation costs than existing WIFI-based real-time location systems (RTLS) options. In some instances, an mZone transmitter configured as provided herein may be amenable to quick installation within a given target space. In some cases, an mZone transmitter configured as provided herein may be battery-operated and thus may be readily relocatable within a given target space. In some instances, use of techniques disclosed herein may provide a hospital, shipping depot, or other facility or locale with accurate location information at a fraction of the cost of traditional WIFI-based RTLS approaches. As will be appreciated in light of this disclosure, Bluetooth communication is a very energy-efficient wireless communication protocol and by using low-cost batteries, several years of operation from beacon tags and mZone transmitters may be achieved, in accordance with some embodiments.

System Architecture and Operation

FIG. 1 illustrates a wireless location tracking system 1000 configured in accordance with an embodiment of the present disclosure. As can be seen, system 1000 may include one or more beacon tags 10, one or more micro-zone (mZone) transmitters 100, a gateway 200, and a server database 230. Moreover, the system 1000 may involve in its operation one or more reader devices 210, the internet 220, and a computing device 240. Each of these various elements is discussed in turn below. More generally, FIG. 1 illustrates communicative coupling of the various constituent elements of system 1000 and the overall flow of data within system 1000, in accordance with some embodiments.

Figure 2:
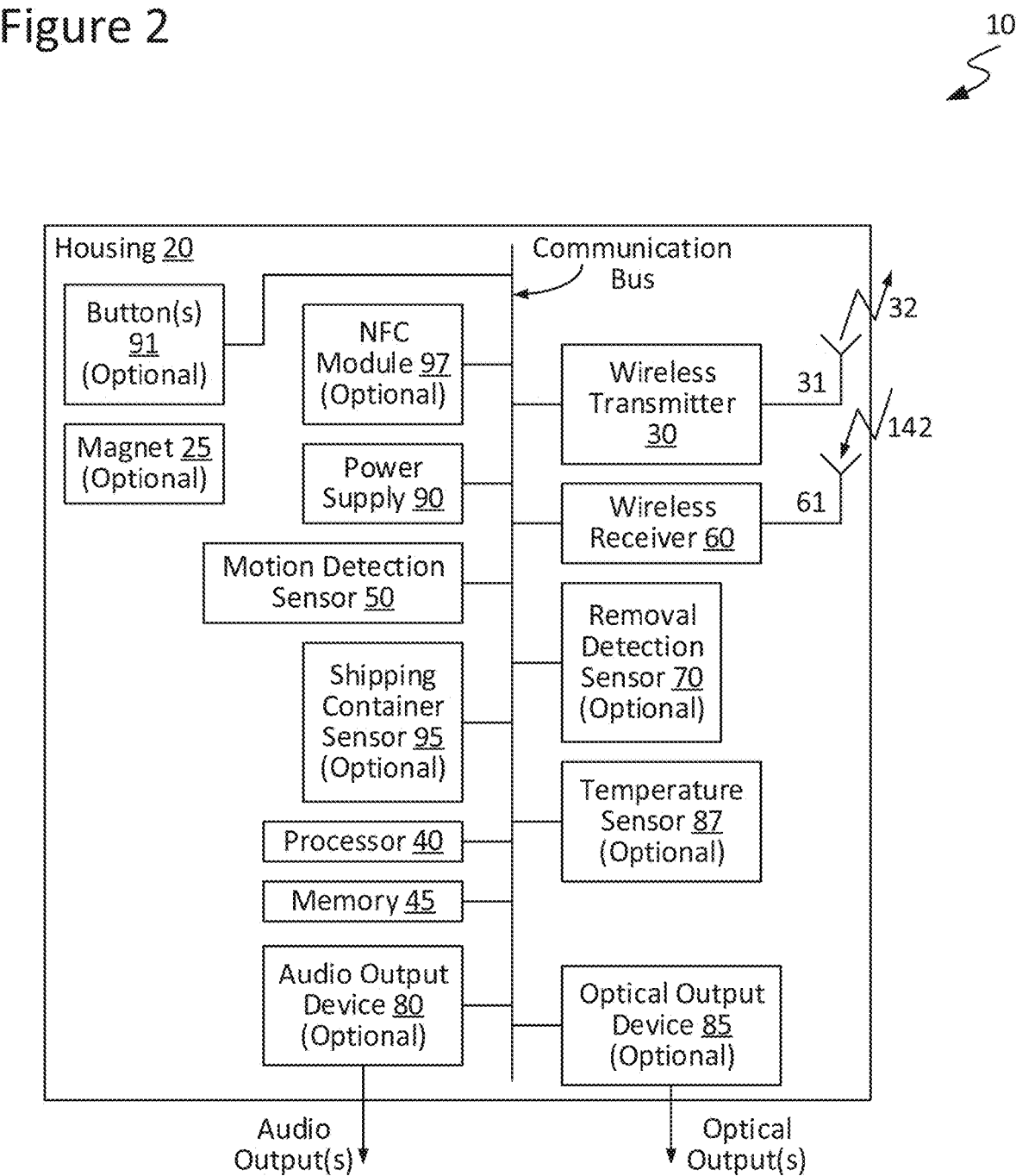
FIG. 2 is a block diagram of a beacon tag configured in accordance with an embodiment of the present disclosure.

A given beacon tag 10 may be configured to be hosted by a given asset of interest such that the location of that asset may be tracked and monitored via system 1000. FIG. 2 is a block diagram of a beacon tag 10 configured in accordance with an embodiment of the present disclosure. As can be seen, beacon tag 10 may include a housing 20 configured to house, in part or in whole, any of the various components of beacon tag 10. The material construction and dimensions of housing 20 may be customized, as desired for a given target application or end-use. Housing 20 may be configured to be mounted to an asset using any of a wide range of suitable mounting means. For instance, in accordance with some embodiments, beacon tag 10 may be configured for mounting to an asset via any one, or combination, of mechanical fasteners (e.g., such as screws, bolts, clamps, or clips, to name a few), adhesive materials (e.g., glue, epoxy, foam tape, or hook-and-loop fasteners, to name a few), and magnets 25. Thus, in a more general sense, and in accordance with some embodiments, beacon tag 10 may be mounted to an asset regardless of the material composition of that asset. Other suitable configurations for housing 20 and any related mounting means will depend on a given application and will be apparent in light of this disclosure.

Beacon tag 10 may include a wireless transmitter 30, which may be either a dedicated transmitter device provided with only transmitting capabilities or a transceiver device provided with both transmitting and receiving capabilities. In accordance with some embodiments, wireless transmitter 30 may be a short-wavelength ultra-high frequency (UHF) radio wave Bluetooth-compatible device configured to transmit and/or receive signals of a frequency in an ISM band of between 2.4-2.485 GHz. In some instances in which wireless transmitter 30 is a transceiver device, it may receive signal(s) from an external source, such as a reader device 210 (discussed below), for example, when configuring beacon tag 10. As a wireless communication device, wireless transmitter 30 may include an antenna 31 configured to transmit and/or receive one or more signals, such as a beacon signal 32 (discussed below). To that end, antenna 31 may be, for example, a printed circuit board (PCB) antenna configured as typically done or any other suitable antenna, as will be apparent in light of this disclosure. In some embodiments, wireless transmitter 30 may be configured to transmit beacon signal 32 from beacon tag 10 at a repetition rate of at least three transmissions per second, though greater or lesser transmission rates may be provided, in accordance with other embodiments. Moreover, the transmission power may be varied, as desired for a given target application or end-use. Other suitable configurations for wireless transmitter 30 and its antenna 31 will depend on a given application and will be apparent in light of this disclosure.

Beacon tag 10 also may include a wireless receiver 60, which may be either a dedicated receiver device provided with only receiving capabilities or a transceiver device provided with both receiving and transmitting capabilities. In accordance with some embodiments, wireless receiver 60 may be a radio-wave wireless receiver device configured to receive and/or transmit signals of a frequency in any one, or combination, of a 902 MHz ISM band, a 915 MHz ISM band, an 869 MHz ISM band, and a 433 MHz ISM band. As a wireless communication device, wireless receiver 60 may include an antenna 61 configured to receive and/or transmit one or more signals, such as an mZone signal 142 transmitted by an mZone transmitter 100 (discussed below). To that end, antenna 61 may be, for example, a PCB antenna configured as typically done or any other suitable antenna, as will be apparent in light of this disclosure. In some embodiments, wireless receiver 60 may be, for example, a very low-duty-cycle device, which may help to conserve the power of power supply 90 (discussed below), at least in some instances. In some embodiments, for within a one-second period, wireless receiver 60 may be turned on and able to receive for a first period of about 1 ms or less and turned off and unable to receive for a second period of about 100 ms or less, thereby conserving power. In accordance with some embodiments, wireless receiver 60 may periodically listen for an incoming data packet (e.g., in an mZone signal 142, discussed below) and, upon reception of a valid data packet, send a wake-up signal to processor 40 (discussed below). Other suitable configurations for wireless receiver 60 and its antenna 61 will depend on a given application and will be apparent in light of this disclosure.

Beacon tag 10 further may include memory 45, which may be implemented with any one, or combination, of volatile and non-volatile memory and may be of any type and size, as desired for a given target application or end-use. In some cases, memory 45 may be configured for use in storing data, on a temporary or permanent basis, whether that data is native to beacon tag 10 or received from another source (e.g., such as an mZone transmitter 100). In some instances, memory 45 may be configured for use as processor workspace for processor 40 (discussed below).

In accordance with some embodiments, memory 45 include, for example, a computer-readable medium that, when executed by a processor (e.g., such as processor 40), carries out any one or more of the functions described herein, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and one or more embedded routines for carrying out device functionality. In a more general sense, memory 45 may be implemented in hardware, software, firmware, or a combination thereof, as desired for a given target application or end-use. Other suitable configurations for memory 45 will depend on a given application and will be apparent in light of this disclosure.

In addition, beacon tag 10 may include a processor 40, which may be configured to communicate with any one, or combination, of the other various components of beacon tag 10 via a communication bus or other suitable interconnect. Processor 40 may be, for example, a central processing unit (CPU), a microcontroller unit (MCU), or any other suitable processing element, as will be apparent in light of this disclosure. In performing a given operation associated with beacon tag 10, processor 40 may be configured to access data stored at memory 45 or otherwise accessible to beacon tag 10. When wireless receiver 60 receives a valid mZone signal 142 from a given mZone transmitter 100 (as discussed below), processor 40 may be alerted and may process the data received via that mZone signal 142, in accordance with some embodiments. Other suitable configurations for processor 40 will depend on a given application and will be apparent in light of this disclosure.

Beacon tag 10 also may include a motion detection sensor 50, which may be a micro-electromechanical system (MEMS) accelerometer device or any other suitable motion detection device, as will be apparent in light of this disclosure. In accordance with some embodiments, motion detection sensor 50 may be configured to detect movement (e.g., translational movement, rotational movement, and so on) of beacon tag 10 or an impact to beacon tag 10 (e.g., such as a single-tap or double-tap on housing 20). Motion detection sensor 50 may be configured, in accordance with some embodiments, to output a wake-up signal to processor 40 in response to its activation as caused by the movement or impact. In response to receipt of this wake-up signal, processor 40 may transition out of a low-power state (e.g., a sleep-state or an off-state) and instruct wireless transmitter 30 to transmit a beacon signal 32 (discussed below) externally from housing 20. Motion detection sensor 50 also may be configured, in accordance with some embodiments, to output a wake-up signal to wireless receiver 60 in response to its activation as caused by the movement or impact. In this manner, wireless receiver 60 may remain in a low-power state (e.g., a sleep-state or off-state) until beacon tag 10 is moved or impacted, at least in some embodiments. In some instances, motion detection sensor 50 may be a low-power device configured to use about 10 µAh or less, for example, of power provided by power supply 90 (discussed below), though other power consumption ratings may be provided in other embodiments. Other suitable configurations for motion detection sensor 50 will depend on a given application and will be apparent in light of this disclosure.

Beacon tag 10 may include a power supply 90, which may be configured to supply a given target amount of power to any of the various components of beacon tag 10. In some embodiments, power supply 90 may be a battery, which may be permanent or replaceable. In some cases, power supply 90 may include or be operatively coupled with a photovoltaic module (e.g., a solar cell) configured to convert light energy to electrical energy for use by beacon tag 10. In accordance with some embodiments, processor 40 may be configured to check the power level of power supply 90 periodically or as otherwise desired. Other suitable configurations for power supply 90 will depend on a given application and will be apparent in light of this disclosure.

In some embodiments, beacon tag 10 optionally may include a removal detection sensor 70, which may be configured to detect removal of beacon tag 10 from an associated asset. To that end, removal detection sensor 70 may utilize any one, or combination, of a magnetic coupling sensor, a capacitive sensor, and an optical sensor, to name a few options. In an example case, removal detection sensor 70 may be a magnetic device configured to be magnetically coupled with a corresponding magnet (or other magnetically compatible element) of the asset hosting beacon tag 10. When beacon tag 10 is removed from the host asset, removal detection sensor 70 may detect breakage of the magnetic coupling and output a signal to processor 40 that is indicative of the removal of beacon tag 10 from its designated asset. Other suitable configurations for optional removal detection sensor 70 will depend on a given application and will be apparent in light of this disclosure.

In some embodiments, beacon tag 10 optionally may include an audio output device 80, which may be a speaker, beeper, or any other device capable of emitting sound of a given frequency, optionally with a given emission period or pattern. In accordance with some embodiments, audio output device 80 may be configured to output audio output signal(s) indicative of a given condition with respect to the operation of beacon tag 10 (or system 1000 more generally). For instance, in sonic cases, audio output device 80 may emit a sound indicative of a low power level of power supply 90. In some cases, audio output device 80 may emit a sound indicative of removal of beacon tag 10 from a host asset, as detected by removal detection sensor 70. In some cases, audio output device 80 may emit a sound indicative of removal of a shipping container 306 from a host chassis 302, as detected by a shipping container sensor 95 (discussed below). Other suitable configurations and uses for optional audio output device 80 will depend on a given application and will be apparent in light of this disclosure.

In some embodiments, beacon tag 10 optionally may include one or more optical output devices 85, which may be a solid-state light source, such as a light-emitting diode (LED), or any other device capable of emitting light of a given wavelength, optionally with a given emission period or pattern. In an example case, beacon tag 10 may include a first optical output device 85 configured to emit light of a first wavelength (e.g., green light) and a second optical output device 85 configured to emit light of a different second wavelength (e.g., red light). In accordance with some embodiments, a given optical output device 85 may be configured to output optical output signal(s) indicative of a given condition with respect to the operation of beacon tag 10 (or system 1000 more generally). For instance, in some cases, a given optical output device 85 may be configured to emit light indicative of any one, or combination, of the same various example conditions discussed above with respect to audio output device 80. Other suitable configurations and uses for optional optical output device(s) 85 will depend on a given application and will be apparent in light of this disclosure.

In some embodiments, beacon tag 10 optionally may include a temperature sensor 87, which may be configured to detect either or both: (1) the ambient temperature surrounding beacon tag 10; and (2) the temperature of the asset hosting beacon tag 10. To such ends, optional temperature sensor 87 may be any suitable temperature sensing device configured as typically done. Other suitable configurations for optional temperature sensor 87 will depend on a given application and will be apparent in light of this disclosure.

Figure 7A:
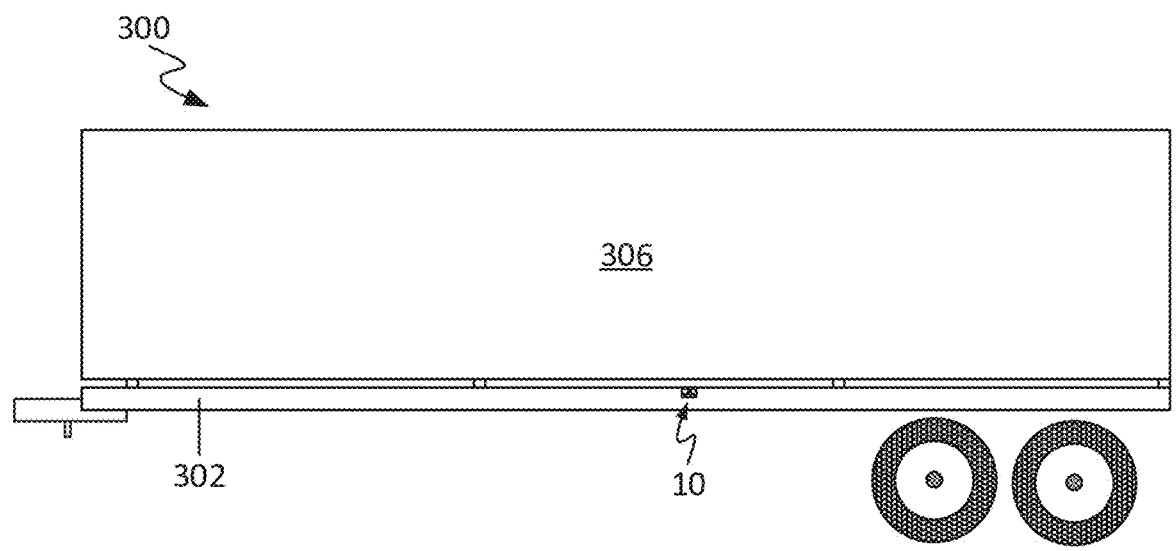
FIG. 7A illustrates a side elevation view of a trailer having a beacon tag mounted to its chassis below a shipping container, in accordance with an embodiment of the present disclosure.
Figure 7B:
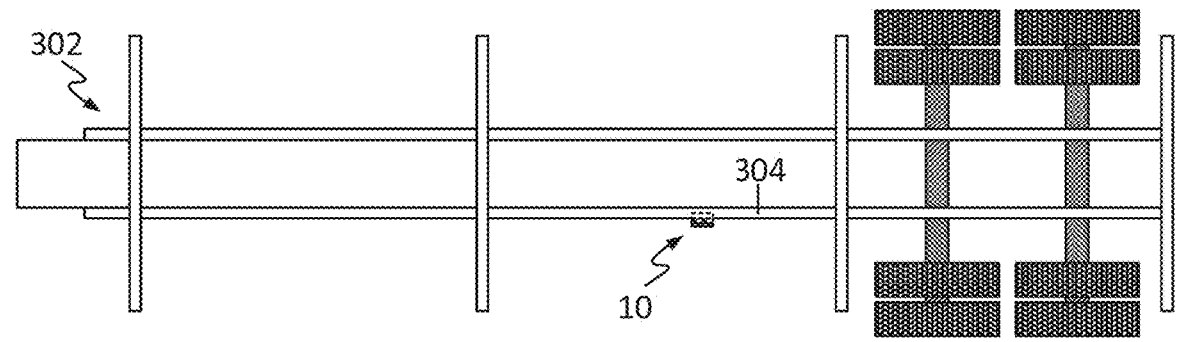
FIG. 7B illustrates a top-down plan view of the chassis of FIG. 7A having a beacon tag mounted thereto, in accordance with an embodiment of the present disclosure.
Figure 8:
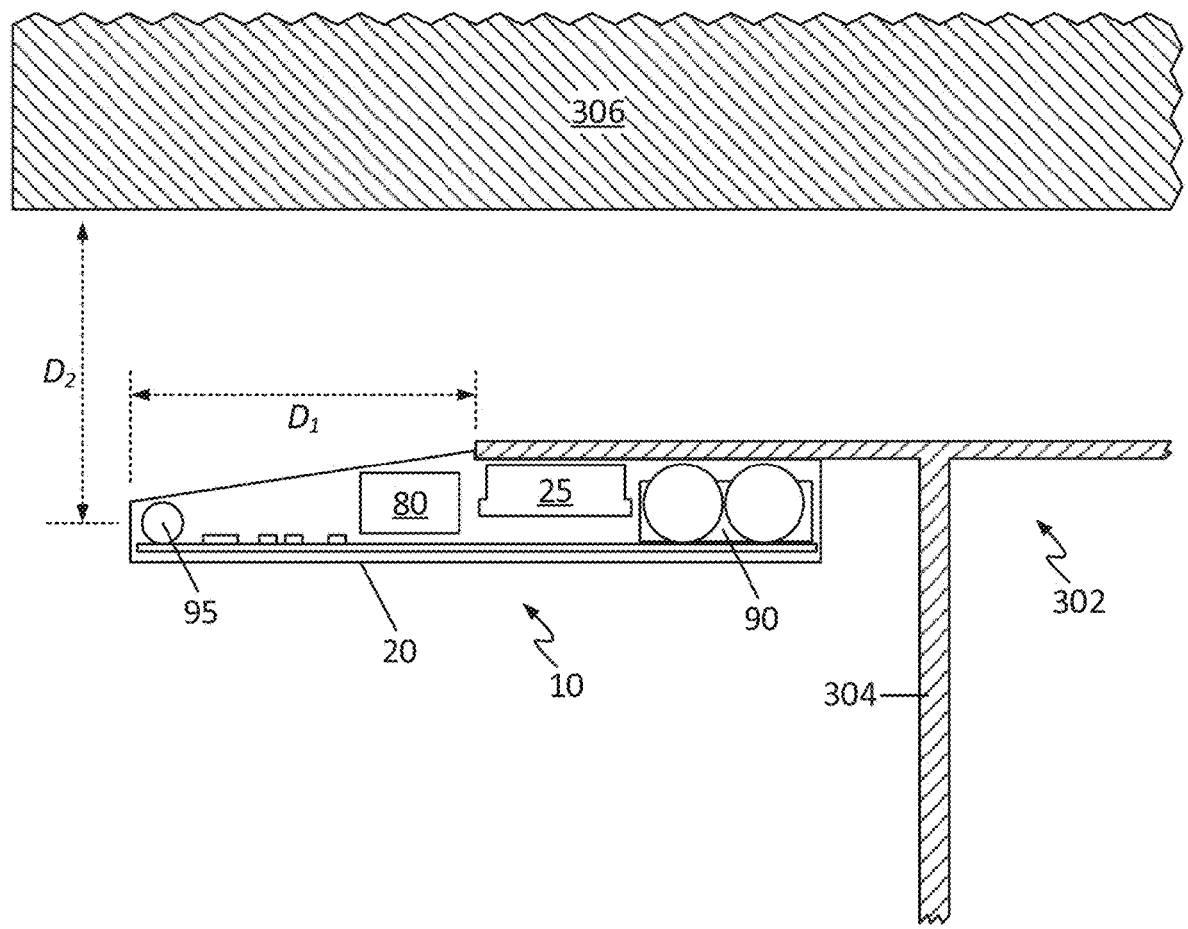
FIG. 8 illustrates a partial cross-section view of a beacon tag mounted on an I-beam of a chassis below a shipping container, in accordance with an embodiment of the present disclosure.

In some embodiments, beacon tag 10 optionally may include a shipping container sensor 95, which may be configured to detect the presence of a shipping container 306 on a chassis 302 hosting beacon tag 10, as discussed below with reference to FIGS. 7A-7B and 8. To such end, shipping container sensor 95 may be any one, or combination, of an inductive sensor, an optical sensor, an acoustic sensor, a radio frequency (RF) sensor, or any other suitable sensor, as will be apparent in light of this disclosure. Shipping container sensor 95 may be configured to periodically check for the presence of a shipping container 306 on a host chassis 302. In accordance with some embodiments, shipping container sensor 95 may be configured to output a signal to processor 40 in response to detecting the mounting or removal of shipping container 306 from a designated chassis 302 hosting beacon tag 10 or any other change of state of interest. In some cases, shipping container sensor 95 may include a processor separate from processor 40 and configured to provide for calibration and temperature compensation. In some such cases, this additional processor may wake up periodically to check the status of shipping container sensor 95 and send the status to processor 40. Other suitable configurations for optional shipping container sensor 95 will depend on a given application and will be apparent in light of this disclosure.

In some embodiments, beacon tag 10 optionally may include a near-field communication (NFC) module 97, which may be configured to transmit and/or receive one or more NFC signals, as typically done. In accordance with some embodiments, NFC module 97 may be utilized, for example, in conjunction with a given contact reader external to beacon tag 10 (e.g., such as at reader device 210, discussed below). Other suitable configurations for optional NFC module 97 will depend on a given application and will be apparent in light of this disclosure.

In some embodiments, beacon tag 10 optionally may include one or more buttons 91, which may be programmable and either a physical control feature (e.g., a physical button, switch, knob, pressure sensor, toggle, slider, and so forth) or a virtual control feature (e.g., a touch-sensitive icon or other element providing any one or more of the aforementioned physical control feature functionalities). In an example case, beacon tag 10 may include a button 91 that, when pressed, causes beacon tag 10 to emit a beacon signal 32. In another example case, beacon tag 10 may include a button 91 that, when pressed, causes beacon tag 10 to enter into a programming mode by which the settings and operation of beacon tag 10 may be customized. In another example case, beacon tag 10 may include a button 91 that, when pressed, causes beacon tag 10 to perform a power level check for power supply 90. Other suitable configurations and functions for button(s) 91 will depend on a given application and will be apparent in light of this disclosure.

It should be noted that beacon tag 10 is not intended to be limited only to the various example sensors and devices discussed above. In accordance with some other embodiments, beacon tag 10 may include any of a wide range of additional (or alternative) sensors, such as any one, or combination, of a moisture sensor, a humidity sensor, a proximity sensor, and a magnetic field sensor, among others. In accordance with some other embodiments, beacon tag 10 may include a haptic feedback or other vibratory output device configured to vibrate in a manner indicative of a given condition with respect to the operation of beacon tag 10 (or system 1000 more generally). In accordance with some other embodiments, beacon tag 10 may include a timer configured to provide a wake-up signal to processor 40, and processor 40 in turn may instruct wireless transmitter 30 to transmit beacon signal 32. In accordance with some embodiments, beacon tag 10 may include a radio-frequency identification (RFID) module configured to communicate with processor 40 and at least one of transmit and receive one or more RFID signals, as typically done. Numerous configurations and variations will be apparent in light of this disclosure.

Figure 3:
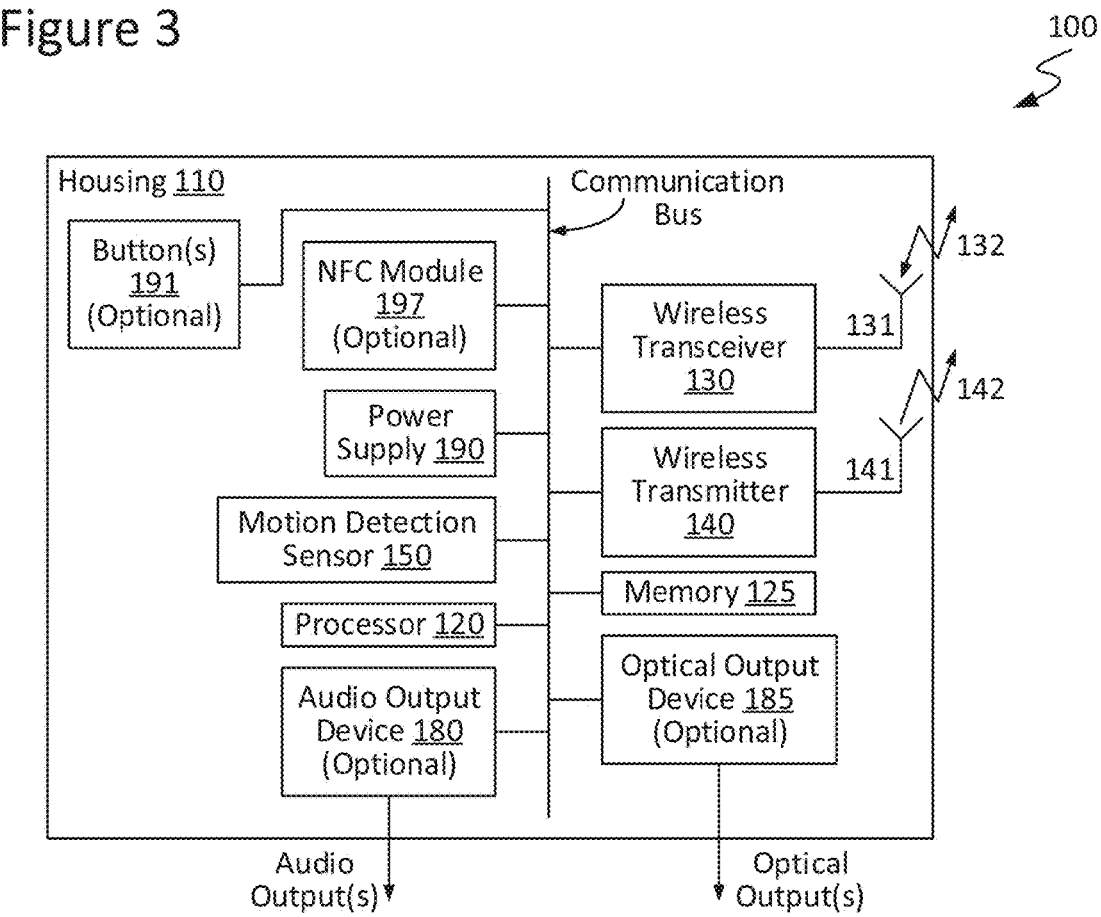
FIG. 3 is a block diagram of a micro-zone (mZone) transmitter configured in accordance with an embodiment of the present disclosure.

Returning to FIG. 1, system 1000 may include one or more mZone transmitters 100. FIG. 3 is a block diagram of an mZone transmitter 100 configured in accordance with an embodiment of the present disclosure. As can be seen, mZone transmitter 100 may include a housing 110 configured to house, in part or in whole, any of the various components of mZone transmitter 100. The material construction and dimensions of housing 110 may be customized, as desired for a given target application or end-use. Other suitable configurations for housing 110 will depend on a given application and will be apparent in light of this disclosure.

MZone transmitter 100 may include a wireless transceiver 130, which may be a dedicated transceiver device provided with both transmitting and receiving capabilities. In accordance with some embodiments, wireless transceiver 130 may be a Bluetooth-compatible device configured to transmit and/or receive signals of a frequency in an ISM band of between 2.4-2.485 GHz. In some embodiments, wireless transceiver 130 may be configured to receive signal(s) 132 from an external source, such as a reader device 210 (discussed below) which include instructions that change the operation of mZone transmitter 100. In some instances, wireless transceiver 130 may be configured to receive signal (s) 132 from an external source, such as a reader device 210, when configuring the settings of mZone transmitter 100. In accordance with some embodiments, mZone transmitter 100 may be configured to transmit a beacon signal 132, which may be of a frequency in an ISM band of between 2.4-2.485 GHz. Beacon signal 132 may include data, for example, pertaining to the status of that source mZone transmitter 100, such as a current power level of its power supply 190 (discussed below). As a wireless communication device, wireless transceiver 130 may include an antenna 131 configured to transmit and/or receive one or more signals, such as a signal 132 (discussed below). To such ends, antenna 131 may be, for example, a PCB antenna configured as typically done or any other suitable antenna, as will be apparent in light of this disclosure. Other suitable configurations for wireless transceiver 130 and its antenna 131 will depend on a given application and will be apparent in light of this disclosure.

MZone transmitter 100 also may include a wireless transmitter 140, which may be either a dedicated transmitter device provided with only transmitting capabilities or a transceiver device provided with both transmitting and receiving capabilities. In some cases, wireless transmitter 140 may be, for example, a wireless transmitter device configured to receive and/or transmit signals of a frequency in any one, or combination, of a 915 MHz ISM band, a 902 MHz ISM band, an 869 MHz ISM hand, and a 433 MHz ISM band. As a wireless communication device, wireless transmitter 140 may include an antenna 141 configured to receive and/or transmit one or more signals, such as an mZone signal 142 (discussed below). To that end, antenna 141 may be, for example, a PCB antenna configured as typically done or any other suitable antenna, as will be apparent in light of this disclosure. In some embodiments, antenna 141 may be omni-directional, directional, or both. In directional cases, antenna 141 also may be circularly polarized, which may help to ensure that a beacon tag 10 within transmission range is more likely to receive mZone signal 142 regardless of the current orientation of that beacon tag 10 on its host asset. In cases where both capabilities are provided, selection may be made, for example, based on the location that is to host mZone transmitter 100. For instance, if mZone transmitter 100 is to be mounted on a ceiling in a multi-floor building, then antenna 141 may transmit in a directional manner to help ensure that RF energy of mZone signal 142 is pointed into the desired target area and does not interfere with wireless communications that may be occurring on neighboring floors. If instead mZone transmitter 100 is to be disposed outdoors, then antenna 141 may be omni-directional to help ensure that mZone signal 142 has the broadest coverage area in the target space.

In accordance with some embodiments, wireless transmitter 140 may be configured such that its transmission range is programmable via processor 120 (discussed below). In some cases, wireless transmitter 140 may have a transmission range in the range of about 5-30 ft. (e.g., about 5-10 ft., about 10-20 ft., about 20-30 ft., or any other sub-range in the range of about 5-30 ft.). Of course, lesser or greater transmission ranges for wireless transmitter 140 may be provided in accordance with other embodiments, as desired for a given target application or end-use. In a more general sense, wireless transmitter 140 may be programmed to control the transmission power and thus range of transmission from several feet to several hundreds of feet. Moreover, by controlling the transmission power of their wireless transmitters 140, mZone transmitters 100 can be placed in relative proximity to each other. For instance, in some cases, mZone transmitters 100 may be spaced apart from one another by about 6 ft. or less. In this manner, system 1000 may be configured to provide coarse or fine-grained location tracking, as desired for a given target application or end-use. If a beacon tag 10 receives more than one mZone signal 142, then it may use the relative signal strength of the received plurality of mZone signals 142 to determine which source mZone transmitter 100 is closest, helping to determine its location.

In accordance with some embodiments, wireless transmitter 140 may be configured to transmit periodically, as desired for a given target application or end-use. For instance, wireless transmitter 140 may transmit for about 100 ms or more and turn off for about 1-2 s, thereby conserving power, and this cycle may be repeated as desired. As will be appreciated in light of this disclosure, this duration of transmission may help to ensure that the wireless receiver 60 of a given beacon tag 10 receives the transmitted mZone signal 142. As will be further appreciated, this relatively long off-time also may help to ensure that two different mZone transmitters 100 do not interfere with one another in cases where their transmission ranges overlap. Other suitable configurations for wireless transmitter 140 and its antenna 141 will depend on a given application and will he apparent in light of this disclosure.

MZone transmitter 100 further may include memory 125, which may be of any of the various example types, sizes, and configurations discussed above, for instance, with respect to memory 45, in accordance with some embodiments. In some cases, memory 125 may be configured for use in storing data, on a temporary or permanent basis, whether that data is native to mZone transmitter 100 or received from another source (e.g., such as a reader device 210). in some instances, memory 125 may be configured for use as processor workspace for processor 120 (discussed below). Other suitable configurations for memory 125 will depend on a given application and will be apparent in light of this disclosure.

In addition, mZone transmitter 100 may include a processor 120, which may be configured to communicate with any one, or combination, of the other various components of mZone transmitter 100 via a communication bus or other suitable interconnect. Processor 120 may be, for example, a CPU, an MCU, or any other suitable processing element, as will be apparent in light of this disclosure. In performing a given operation associated with mZone transmitter 100, processor 120 may be configured to access data stored at memory 125 or otherwise accessible to mZone transmitter 100. In accordance with some embodiments, processor 120 may output a control signal to wireless transmitter 140 causing it to transmit periodic data packets in an mZone signal 142 at a programmable transmission strength and transmission range. Other suitable configurations for processor 120 will depend on a given application and will be apparent in light of this disclosure.

MZone transmitter 100 also may include a motion detection sensor 150, which may be of any of the various example configurations discussed above, for instance, with respect to motion detection sensor 50, in accordance with some embodiments. Motion detection sensor 150 may be configured, in accordance with some embodiments, to detect movement of mZone transmitter 100, which may be indicative of removal thereof from its designated location. Other suitable configurations for motion detection sensor 150 will depend on a given application and will be apparent in light of this disclosure.

MZone transmitter 100 may include a power supply 190, which may be configured to supply a given target amount of power to any of the various components of mZone transmitter 100. In some embodiments, power supply 190 may be a battery, which may be permanent or replaceable. In an example case, power supply 190 may be a battery configured to power mZone transmitter 100 for a year or more without need of replacement. In some embodiments, power supply 190 may be an AC power supply (with appropriate DC power conversion capabilities). In some embodiments, power supply 190 may include or be operatively coupled with a photovoltaic module (e.g., a solar cell) configured to convert light energy to electrical energy for use by mZone transmitter 100. Other suitable configurations for power supply 190 will depend on a given application and will be apparent in light of this disclosure.

In some embodiments, mZone transmitter 100 optionally may include an audio output device 180, which may be of any of the example configurations discussed above, for instance, with respect to audio output device 80. In accordance with some embodiments, audio output device 180 may be configured to output audio output signal(s) indicative of a given condition with respect to the operation of mZone transmitter 100 (or system 1000 more generally). For instance, in some cases, audio output device 180 may emit a sound indicative of a low power level of power supply 190. In some cases, audio output device 180 may emit a sound indicative of movement of mZone transmitter 100 from its designated location, as detected by motion detection sensor 150. Other suitable configurations and uses for optional audio output device 180 will depend on a given application and will be apparent in light of this disclosure.

In some embodiments, mZone transmitter 100 optionally may include one or more optical output devices 185, which may be of any of the example configurations discussed above, for instance, with respect to optical output device 85. In accordance with some embodiments, a given optical output device 185 may be configured to output optical output signal(s) indicative of a given condition with respect to the operation of mZone transmitter 100 (or system 1000 more generally). For instance, in some cases, a given optical output device 185 may be configured to emit light indicative of any one, or combination, of the same various example conditions discussed above with respect to audio output device 180. Other suitable configurations for optional optical output device(s) 185 will depend on a given application and will be apparent in light of this disclosure.

In some embodiments, mZone transmitter 100 optionally may include one or more buttons 191, which may be programmable and of any of the various example physical and virtual configurations discussed above with respect to button(s) 91. In an example case, mZone transmitter 100 may include a button 191 that, when pressed, causes mZone transmitter 100 to emit an mZone signal 142. In another example case, mZone transmitter 100 may include a button 191 that, when pressed, causes mZone transmitter 100 to enter into a programming mode by which the settings and operation of mZone transmitter 100 may be customized. In another example case, mZone transmitter 100 may include a button 191 that, when pressed, causes mZone transmitter 100 to perform a power level check for power supply 190. Other suitable configurations and functions for button(s) 191 will depend on a given application and will be apparent in light of this disclosure.

It should be noted that beacon tags 10 and mZone transmitters 100 are not intended to be limited only to the example configurations described above and illustrated in FIGS. 2-3, as numerous other configurations and variations will be apparent in light of this disclosure. For instance, in some other embodiments, any (or all) of memory 45, processor 40, wireless transmitter 30, and wireless receiver 60 may be provided as a single device having the capabilities of each attendant component. Similarly, in some embodiments, any (or all) of memory 125, processor 120, wireless transceiver 130, and wireless transmitter 140 may be provided as a single device having the capabilities of each attendant component.

As previously noted, wireless transmitter 30 of beacon tag 10 may be configured to output a beacon signal 32, which may be, for example, a Bluetooth signal of a frequency in an ISM band of between 2.4-2.485 GHz. In accordance with some embodiments, beacon signal 32 may be of the Bluetooth 4.0 standard advertising beacon format, which may allow manufacturers to create custom-formatted attribute definitions and data for transmission by wireless transmitter 30. In at least some such cases, a given data packet of beacon signal 32 may be of standard Bluetooth signal length (e.g., thirty-one bytes).

Figure 4:
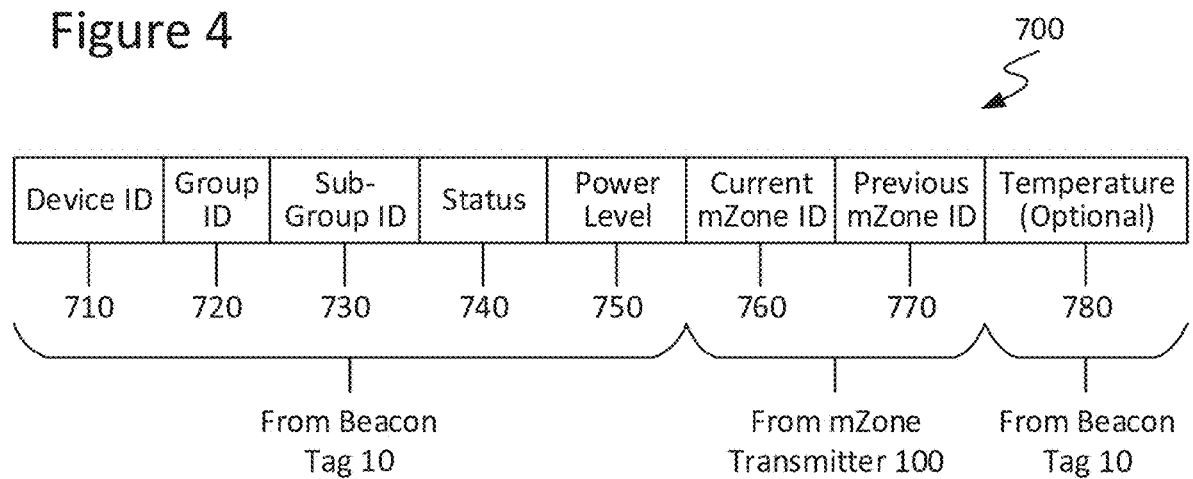
FIG. 4 represents several data fields of a data packet which may be transmitted by a beacon tag in a beacon signal, in accordance with an embodiment of the present disclosure.

FIG. 4 represents several data fields of a data packet 700 which may be transmitted by beacon tag 10 in a beacon signal 32, in accordance with an embodiment of the present disclosure. As can be seen, in some cases, beacon tag 10 may transmit a data packet 700 including Device ID 710 data. Device ID 710 data may be an identifier (e.g., such as an address or a manufacture code) unique to the source beacon tag 10 transmitting beacon signal 32 and, as such, may be utilized as a unique identifier for each asset hosting a beacon tag 10. In an example case, Device ID 710 data may be 6 bytes in size, though in other cases, lesser or greater byte sizes may be provided, as desired for a given target application or end-use.

In some cases, beacon tag 10 may transmit a data packet 700 including Group ID 710 data and/or Sub-Group ID 720 data. Group ID 710 data and Sub-Group ID 720 data may be group and sub-group identifiers assigned to different beacon tags 10 and their attendant assets. Thus, in accordance with some embodiments, a plurality of beacon tags 10 may be filtered, for example, to identify only those assets associated with the group and/or sub-group identifier(s) searched. In this manner, the tagged assets of given customer or owner may be discerned readily amongst larger grouping of tagged assets.

In some cases, beacon tag 10 may transmit a data packet 700 including Status 740 data, which may cover any of a wide range of conditions and communications. In some cases, Status 740 data may include data pertaining to the current or most recent status of motion detection sensor 50 (e.g., in a state of motion or having received a detectable impact). In some cases, Status 740 data may include data pertaining to the current or most recent status of wireless receiver 60 (e.g., receiving an mZone signal 142 or in a low-power state). In some cases, Status 740 data may include data pertaining to the current or most recent status of any of the various sensors of beacon tag 10. For instance, Status 740 data may include data obtained via removal detection sensor 70 (e.g., indicative of the mounting or removal of beacon tag 10 from an asset). Numerous options for data which may be encoded in the Status 740 data of a given data packet 700 of beacon signal 32 will be apparent in light of this disclosure.

In some cases, beacon tag 10 may transmit a data packet 700 including Power Level 750 data. Inclusion of Power Level 750 data in beacon signal 32 may help to provide an early warning if a given beacon tag 10 is running low on power provided by its power supply 90. In accordance with some embodiments, this can be used to guard against power failures of one or more portions of system 1000.

In some cases, beacon tag 10 may transmit a data packet 700 including Current mZone ID 760 data and/or Previous mZone ID 770 data. In accordance with some embodiments, as beacon tag 10 enters the transmission range of a first mZone transmitter 100 and receives its mZone signal 142, it may pull the mZone ID 820 from that signal 142 and initially store it as Current mZone ID 760 data. As beacon tag 10 leaves the transmission range of the first mZone transmitter 100 and enters the transmission range of a different second mZone transmitter 100, receiving its mZone signal 142, it may pull the mZone ID 820 from that latter mZone signal 142 and store it as Current mZone ID 760 data, transitioning the mZone ID 820 from the first mZone transmitter 100 to being stored as Previous mZone ID 770 data. Thus, the Current mZone ID 760 data and Previous mZone ID 770 data may serve to provide a history for the tracking of the asset hosting beacon tag 10. That is, the Current mZone ID 760 data may include data pertaining to the current location of the beacon tag 10, and the Previous mZone ID 770 data may include data pertaining to the previous location of the beacon tag 10, and thus the asset hosting beacon tag 10 may be tracked at each step of the way. In some example cases, either (or both) of Current mZone ID 760 data and Previous mZone ID 770 data may he 3 bytes in size, though in other cases, lesser or greater byte sizes may be provided, as desired for a given target application or end-use.

In some cases, beacon tag 10 may transmit a data packet 700 optionally including additional data. For example, in some instances, data packet 700 may include Temperature 780 data, which may originate from a temperature sensor 70 optionally included with beacon tag 10. In such cases, Temperature 780 data may pertain to either (or both) the ambient temperature surrounding beacon tag 10 and the temperature of the asset to which beacon tag 10 is attached. The present disclosure is not intended to be so limited only to the example case of additional Temperature 780 data, however. In a more general sense, and in accordance with some embodiments, data provided by any sensor of beacon tag 10 may be stored in this manner as a portion of a data packet 700 to be transmitted by beacon tag 10 in a beacon signal 32. As previously discussed, some example sources of additional data may include a moisture sensor, a humidity sensor, a proximity sensor, and a magnetic field sensor, among others.

As previously noted, wireless transmitter 140 of mZone transmitter 100 may be configured to output an mZone signal 142. Signal 142 may be of a frequency in any one, or combination, of a 902 MHz ISM band, a 915 MHz ISM band, an 869 MHz ISM band, and a 433 MHz ISM band and, in at least some instances, may be of a proprietary short data packet format. In accordance with some embodiments, a given mZone signal 142 may include a data packet having a command byte followed by one or more identifier fields. Depending on which command and identifier field(s) are provided, the nature of the mZone signal 142, as well as the operation of a recipient downstream beacon tag 10 (or other downstream element of system 1000), may change accordingly.

In accordance with some embodiments, when a given beacon tag 10 within range of mZone transmitter 100 receives an mZone signal 142 including a specific command and one or more identifier fields, its processor 40 may attempt to match the received identifier data with identifier data stored in memory 45, and, if there is a match, execute the command. In response to decoding an mZone signal 142 including a command and matching identifier field(s), the recipient beacon tag 10 may: (1) generate an audio output (e.g., via audio output device 80); (2) generate an optical output (e.g., via an optical output device 85); and/or (3) transmit its beacon signal 32 at a higher rate than other beacon tag(s) 10 within range of the source mZone transmitter 100.

As will be appreciated in light of this disclosure, it may be desirable to ensure that a given data packet of a given mZone signal 142 is kept relatively short so that a given beacon tag 10 within range of the source mZone transmitter 100 may receive it (via mZone signal 142) with minimal on-time at a very low duty cycle. In at least some instances, mZone signal 142 may be of a proprietary short data packet format. For example, in at least some embodiments, mZone signal 142 may include a command byte and up to ten other data bytes. In accordance with some embodiments, the RF data rate for mZone signal 142 may be sufficiently high to keep mZone signal 142 short enough to be received by the wireless receiver 60 of a given beacon tag 10 within a time window of about 1 ms or less. To this end, several parameters, including modulation scheme and bit rate, may be customized, as desired for a given target application or end-use.

Figure 5A:
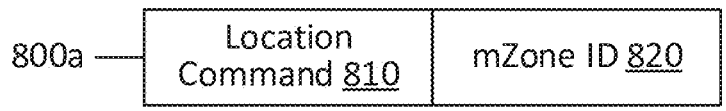
FIGS. 5A-5F represent data fields of several data packets which may be transmitted by an mZone transmitter in an mZone signal, in accordance with several embodiments of the present disclosure.

FIG. 5A represents several data fields of a data packet 800a which may be transmitted by mZone transmitter 100 in an mZone signal 142, in accordance with an embodiment of the present disclosure. As can be seen, in some cases, mZone transmitter 100 may transmit a data packet 800a including: (1) a Location Command 810; and (2) mZone ID 820 data. The mZone ID 820 data may be an identifier unique to the source mZone transmitter 100 transmitting mZone signal 142 and, as such, may be utilized as a unique identifier for the location where that mZone transmitter 100 is disposed. Data packet 800a of mZone signal 142 may be received by beacons tag(s) 10 within range, thereby providing those beacon tag(s) 10 with location information in relation to the source mZone transmitter 100 of that mZone signal 142. A beacon tag 10 receiving such an mZone signal 142 may add the mZone ID 820 data (which may be indicative of the source mZone transmitter 100) in the Current mZone ID 760 data field and/or the Previous mZone ID 770 data field of a data packet 700 that it subsequently transmits in its beacon signal 32. In this manner, the location of that beacon tag 10 with respect to one or more mZone transmitters 100 that sourced the received mZone signal(s) 142 may be determined.

Figure 5B:
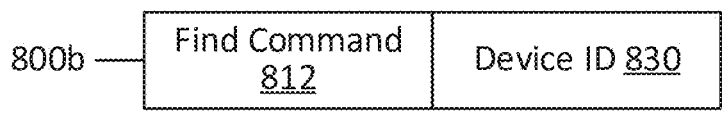

FIG. 5B represents several data fields of a data packet 800b which may be transmitted by mZone transmitter 100 in an mZone signal 142, in accordance with an embodiment of the present disclosure. As can be seen, in some cases, mZone transmitter 100 may transmit a data. packet 800b including: (1) a Find Command 812; and (2) Device ID 830 data. A beacon tag 10 receiving such an mZone signal 142 may compare the Device ID 830 data received in data packet 800*b* with Device ID 710 data stored in memory 45. If a match is made, beacon tag 10 may activate an indicator device, such as an audio output device 80 or an optical output device 85, whereby a user may follow the emitted sound or light to the location of the source beacon tag 10. Alternatively, or additionally, if a match is made, beacon tag 10 may begin transmitting its beacon signal 32 at a higher rate and/or a higher transmission power than normal. For instance, as previously noted, in its normal mode of operation, a given beacon tag 10 may transmit a beacon signal 32 once every three to ten seconds or so with a given designated default power level corresponding to the desired transmission range for that beacon tag 10. However, at least in some cases, this default transmission rate may be too slow for use in some forms of on-foot tracking, and the default transmission power level may be too low to reach gateway 200. Thus, beacon signal 32 may be temporarily transmitted at a heightened rate and/or power, helping the source beacon tag 10 to stand out more discernibly from other beacon tags 10 that are not of interest. For instance, if beacon tag 10 normally transmits its beacon signal 32 once every three to ten seconds or so, then in executing Find Command 812, beacon tag 10 may increase the transmission rate of beacon signal 32 to several times per second. Moreover, by transmitting beacon signal 32 at the higher rate but not continuously, power consumption may be reduced, improving the longevity of power supply 90. Additionally, or alternatively, in executing Find Command 812, beacon tag 10 may increase the transmission power, providing for a transmission range of 100 m or more in some instances.

Furthermore, by causing only a single beacon tag 10 or a specific group of beacon tags 10 to transmit beacon signal 32 rather than causing all beacon tags 10 to do so, confusion as to which beacon tag(s) 10 are transmitting may be reduced. That is, by increasing the transmission rate and/or power of beacon signal 32 for a short period of time, reader device 210 and/or gateway 200 may be able to single out the source beacon tag 10 from a crowd of other beacon tags 10. Additionally, a reader device 210 receiving the high-frequency beacon signal 32 may use the detected signal strength as a proximity and direction signal, leading to the location of the beacon tag 10, and thus asset, of interest. In this manner, the location of a specific beacon tag 10 of interest within range of the mZone transmitter 100 that sourced the mZone signal 142 may be determined. Because a given beacon tag 10 is paired with a given asset, and this pairing information is stored in server database 230, one may search for any asset of interest by searching for the beacon tag 10 paired therewith. More generally, data packet 800*b* may be used to find a specific beacon tag 10 meeting one or more designated criteria.

Figure 5C:
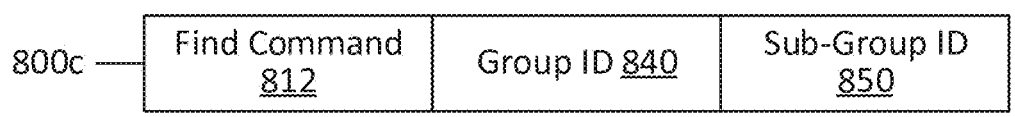

FIG. 5C represents several data fields of a data packet 800*c* which may be transmitted by mZone transmitter 100 in an mZone signal 142, in accordance with an embodiment of the present disclosure. As can be seen, in some cases, mZone transmitter 100 may transmit a data packet 800*c* including: (1) a Find Command 812; and (2) either (or both) Group ID 840 data and Sub-Group ID 850 data. A beacon tag 10 receiving such an mZone signal 142 may compare the Group ID 840 data and/or Sub-Group ID 850 data received in data packet 800*c* with Group ID 720 data and/or Sub-Group ID 730 data stored in memory 45 and, if a match is made, activate an indicator device and/or change the transmission rate and/or power of beacon tag 10, as previously discussed. In this manner, the location of a specific group/sub-group of one or more beacon tags 10 of interest within range of the mZone transmitter 100 that sourced the mZone signal 142 may be determined. More generally, data packet 800*c* may be used to find a specific group or sub-group of beacon tags 10 meeting one or more designated criteria.

Figure 5D:
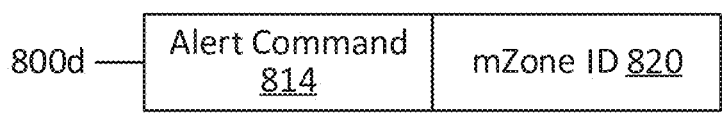

FIG. 5D represents several data fields of a data packet 800*d* which may be transmitted by mZone transmitter 100 in an mZone signal 142, in accordance with an embodiment of the present disclosure. As can be seen, in some cases, mZone transmitter 100 may transmit a data packet 800*d* including: (1) an Alert Command 814; and (2) mZone ID 820 data. A beacon tag 10 receiving such an mZone signal 142 may add the alert in the Status 740 field of a data packet 700 that it subsequently transmits in a beacon signal 32. In this manner, the presence of a given beacon tag 10 of interest within range of the mZone transmitter 100 that sourced the signal 142 may be determined, discretely if desired.

Figure 5E:
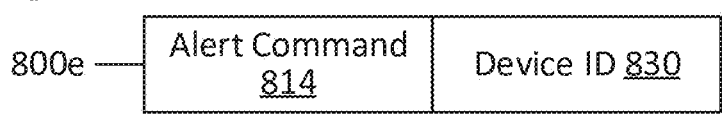

FIG. 5E represents several data fields of a data packet 800*e* which may be transmitted by mZone transmitter 100 in an mZone signal 142, in accordance with an embodiment of the present disclosure. As can be seen, in some cases, mZone transmitter 100 may transmit a data packet 800*e* including: (1) an Alert Command 814; and (2) Device ID 830 data. A beacon tag 10 receiving such a signal 142 may compare the Device ID 830 data received in data packet 800*e* with Device ID 710 data stored in memory 45 and, if a match is made or is not made (whichever is the desired qualifier for a given target application or end-use), add the alert in the Status 740 field of a data packet 700 that it subsequently transmits in a beacon signal 32. In this manner, the presence of a given beacon tag 10 of interest within range of the mZone transmitter 100 that sourced the mZone signal 142 may be determined, discretely if desired.

Figure 5F:
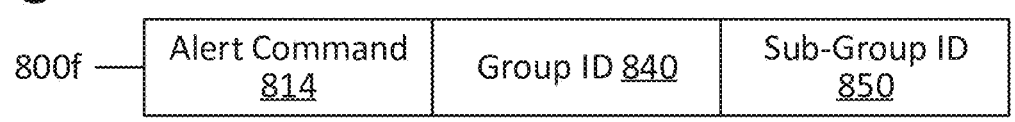

FIG. 5F represents several data fields of a data packet 800*f* which may be transmitted by mZone transmitter 100 in an mZone signal 142, in accordance with an embodiment of the present disclosure. As can he seen, in some cases, mZone transmitter 100 may transmit a data packet 800*f* including: (1) an Alert Command 814; and (2) either (or both) Group ID 840 data and Sub-Group ID 850 data. A beacon tag 10 receiving such an mZone signal 142 may compare the Group ID 840 data and/or Sub-Group ID 850 data received in data packet 800*f* with Group ID 720 data and/or Sub-Group ID 730 data stored in memory 45 and, if a match is made or is not made (whichever is the desired qualifier for a given target application or end-use), add the alert in the Status 740 field of a data packet 700 that it subsequently transmits in a beacon signal 32. In this manner, the presence of a specific group/sub-group of one or more beacon tags 10 of interest within range of the mZone transmitter 100 that sourced the mZone signal 142 may be determined, discretely if desired.

In accordance with some embodiments, mZone transmitter 100 may be programmed to transmit an mZone signal 142 including its identifier data in a data packet 800*a* (with Location Command 810) or a data packet 800*d* (with Alert Command 814) by default. In accordance with some embodiments, Find Command 812 may be a limited-time command (e.g., for about 1-2 minutes or so), in that mZone transmitter 100 may revert to a different default transmission state (e.g., transmitting an mZone signal 142 including a Location Command 810 or an Alert Command 814) after a given period. Contrariwise, in accordance with some embodiments, Alert Command 814 may be a persistent command, in that mZone transmitter 100 may remain in the alert transmission state until instructed to change.

Returning to FIG. 1, system 1000 further may include a gateway 200, which may be configured, in accordance with some embodiments, to receive data gathered from beacon tag(s) 10 and/or mZone transmitter(s) 100 and transmit that data to a server database 230 via internet 220. To such ends, gateway 200 may be configured to utilize any one or combination of suitable communication protocols, wired or wireless, such as, for example, Ethernet, Bluetooth, WIFI, and cellular, among others. In accordance with some embodiments, gateway 200 may be any one, or combination, of fixed Bluetooth-to-WIFI, cellular-to-WIFI, or cellular-to-Bluetooth bridge/hub devices. Gateway 200 may he used to read all beacon signal(s) 32 from beacon tag(s) 10, all beacon signal(s) 132 from mZone transmitter(s) 100, and all mZone signals 142 from mZone transmitter(s) 100 within range and to forward the information over a network interface to internet 220 and server database 230. As noted above, in some instances, mZone transmitter 100 may transmit a beacon signal 132 including data pertaining to its operation, such as the current power level of its power supply 190. In accordance with some embodiments, gateway 200 may he configured to receive such a beacon signal 132 and relay information obtained therefrom to server database 230, providing for a mechanism by which the integrity status of system 1000, in part or in whole, may be determined. Other suitable configurations for gateway 200 will depend on a given application and will be apparent in light of this disclosure.

System 1000 further involve use of a reader device 210, mobile or otherwise, which may be any one, or combination, of a laptop/notebook computer, a sub-notebook computer, a tablet computer, a desktop computer, a mobile phone, a smartphone, a personal digital assistant (PDA), and a cellular handset. In accordance with some embodiments, reader device 210 may be configured for monitoring and controlling operation of any part or the totality of system 1000 and its various constituent elements. In some cases, reader device 210 may be a dedicated reader device configured specifically to such ends, whereas in some other cases, reader device 210 may be a general computing device configured for use to such ends, optionally hosting an application to facilitate its use in monitoring and controlling operation of system 1000. In accordance with some embodiments, reader device 210 may be utilized in assigning/ pairing a given beacon tag 10 with a given asset and in searching for and filtering through beacon tags 10. In accordance with some embodiments, reader device 210 may pull from server database 230 any user-designated names of beacon tags 10 and mZone transmitters 100 and display them for user review, thereby facilitating the user's understanding of which specific tagged assets and which specific locations through which the tagged assets have traveled are being considered.

In accordance with some embodiments, reader device 210 may be configured to transmit a command signal 132 to a given mZone transmitter 100 and, at least in some embodiments, may host an application or other software specifically to that end. In at least some cases, such a command signal 132 may be of the Bluetooth 4.0 standard protocol specification to connect and transfer data between reader device 210 and mZone transmitter 100. In accordance with some embodiments, command signal 132 may instruct a recipient mZone transmitter 100 to transmit an mZone signal 142 including any of the various data packets 800a-800f. In this manner, mZone transmitter 100 may be switched from a Standard. Mode (e.g., transmitting a data packet 800a) to an Asset Find Mode (e.g., transmitting any of data packets 800b-800c) or an Alert Mode (e.g., transmitting any of data packets 800d-800f), addressing a single beacon tag 10 or multiple beacon tags 10, as desired. Reader device 210 may be used to locate the beacon tag 10 utilizing any one, or combination, of audible output of audio output device 80, optical output of optical output device 85, and the high-frequency and/or high-power beacon signal 32. Other suitable configurations for a given reader device 210 will depend on a given application and will be apparent in light of this disclosure.

Server database 230, which may be accessible through the interne 220, may be cloud-based, in part or in whole. As a means of data storage, server database 230 may be configured to store information saved thereat, for instance, by any of mZone transmitter(s) 100, beacon tag(s) 10, reader device(s) 210, and computing device(s) 240. In an example case, server database 230 may store information about assignment/pairing of a given beacon tag 10 with a given asset, which may be retrieved by reader device 210 or computing device 240, for example. In another example case, server database 230 may store information about user-designated familiar names for beacon tags 10 and mZone transmitters 100, which may be retrieved by reader device 210 or computing device 240, for example. That is, reader device 210 may read the actual Device ID 710 (from a beacon tag 10) or mZone ID 820 (from an mZone transmitter 100), compare that with data on server database 230, and pull the designated familiar name from server database 230 for review by the user, helping to ensure that the user understands which elements of system 1000 are being considered at a time. In accordance with sonic embodiments, server database 230 may be configured to verify that system 1000 is properly working and that the battery or other power supply status of all beacon tags 10 and mZone transmitters 100 is good. Thus, server database 230 may be used to monitor mZone transmitter(s) 100 to determine whether there is need to replace any given power supply 190. In a more general sense, server database 230 may allow for a given desired degree of inter-networking of the components of system 1000 and other elements as part of the interne of things (IOT), in accordance with some embodiments. Other suitable configurations for server database 230 will depend on a given application and will be apparent in light of this disclosure.

Computing device 240 may be any one, or combination, of a laptop/notebook computer, a sub-notebook computer, a tablet computer, a desktop computer, a mobile phone, a smartphone, a PDA, a cellular handset, a television set, a computer monitor, and a video conferencing system. Computing device 240 may be configured for communication with server database 230 utilizing wired communication via. Universal Serial Bus (USB), Ethernet, FireWire, or other wired communicating interfacing, wireless communication via WIFI, Bluetooth, or other wireless communication interfacing, or a combination of any thereof. In accordance with some embodiments, computing device 240 may host a browser or other software application configured to facilitate review of information pertinent to any part or the totality of system 1000 and its various constituent elements. Computing device 240 may be configured, in accordance with some embodiments, to access server database 230 to display the current and/or previous location of a given asset tagged with a beacon tag 10, based on the fixed location of reported mZone transmitters 100. In some cases, computing device 240 and reader device 210 may be the same device. Other suitable configurations for computing device 240 will depend on a given application and will be apparent in light of this disclosure.

In accordance with some embodiments, a given mZone transmitter 100 may send a small data packet 800a-800f in an mZone signal 142 over either the 915 MHz ISM band, the 902 MHz ISM band, or the 869 MHz ISM band. The data packet 800a-800f may include an identification code (e.g., mZone ID 820) of the relevant mZone transmitter 140 or other information of interest (e.g., Device ID 830; Group ID 840; Sub-Group ID 850). Beacon tag(s) 10 within transmission range may receive that mZone signal 142 and pull data from the received mZone signal 142. Because the source mZone transmitter 100 is in a fixed position, the location of the beacon tag 10 can be mapped to be within transmission range of that mZone transmitter 100. Thus, mZone ID 820, received by beacon tag 10, may serve as an indicator that the beacon tag 10 is proximate the specific mZone transmitter 820 having that mZone ID 820. A given recipient beacon tag 10 then may relay that identifier data, along with data of its own, via a transmitted beacon signal 32, which may be received by gateway 200 and/or a reader device 210. When gateway 200 receives the beacon signal 32, it may deliver data from beacon signal 32 to server database 230 (via the Internet 220), where it may be viewed, for instance, by a computing device 240 via a web browser or other suitable means and/or by a reader device 210 having access to server database 230.

To pair a beacon tag 10 with a given asset, the beacon tag 10 of interest may be identified in any of several ways. For instance, in accordance with some embodiments, the beacon tag 10 may receive an impact (e.g., such as a double-tap on housing 20), in response it may output a beacon signal 32 that includes data making it easier for a reader device 210 to identify that beacon tag 10 to be paired with the asset. In accordance with some other embodiments, the beacon tag 10 may be held proximate reader device 210 and, because the signal strength of beacon signal 32 would be above a designated threshold level, it would be easy for reader device 210 to identify that beacon tag 10 to be paired with the asset. In some cases, the asset name may be entered or selected on reader device 210. In some other cases, reader device 210 may be used to scan an asset code (e.g., bar code, QR code, NFC tag, and so on). Optionally, a user may input more familiar names and other custom information pertinent to the beacon tag 10 and asset being paired to help facilitate review and management of the various elements of system 1000. Thereafter, the pairing and naming information may be sent to server database 230, where it may be stored for subsequent retrieval in operation of system 1000.

To mark the current location of an asset, with a reader device 210 near the asset tagged with a beacon tag 10, motion detection sensor 50 or other on-board sensor may be used to generate a signal to notify beacon tag 10 to mark the current location, in accordance with some embodiments. This may cause beacon tag 10 to send out a beacon signal 32 with data pertaining to the desired marked location in Status 740 field, which is received by reader device 210, and using a GPS in reader device 210, the location of the asset may be recorded and sent to server database 230, in accordance with some embodiments.

Example Applications

As will be appreciated in light of this disclosure, system 1000 may be utilized in tracking any number and type of assets, such as equipment and personnel, in any of a wide range of applications and contexts.

Figure 6:
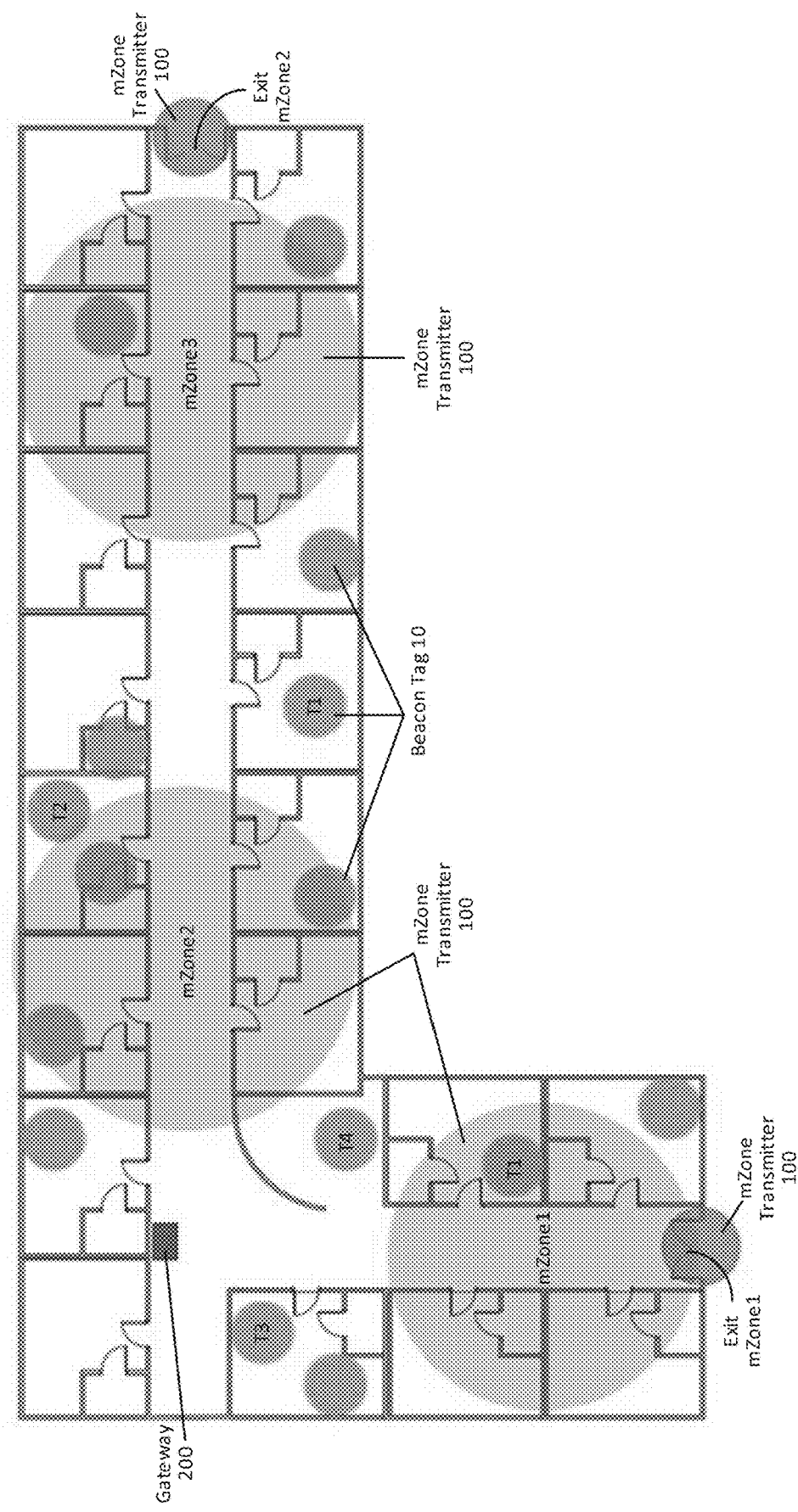
FIG. 6 is a top-down plan view of a hospital wing illustrating an example case of using a wireless tracking system to track assets, in accordance with an embodiment of the present disclosure.

In accordance with some embodiments, system 1000 may be utilized in tracking assets and personnel in a facility, such as a hospital. FIG. 6 is a top-down plan view of a hospital wing illustrating an example case of using system 1000 to track assets, in accordance with an embodiment of the present disclosure. As can be seen in the illustrated example case, the hospital wing includes three separate mZone transmitters 100 located along the central hallway, labeled mZone1, mZone2, and mZone3, and two more mZone transmitter 100 located at the exits, labeled Exit mZone1 and Exit mZone2. As shown, the transmission range of the mZone transmitters 100 at the exits optionally may be less than the mZone transmitters 100 along the hallway (e.g., as generally represented by the difference in size of the shaded circles indicating transmission range).

If an asset hosting a beacon tag 10 moves through one of the two exits, the local mZone transmitter 100 (either Exit mZone1 or Exit mZone2, as the case may be) will detect the departure or arrival. Because the beacon signal 32 transmitted by beacon tag 10 includes data pertaining to the current mZone ID 750 and the previous mZone ID 760, when the asset hosting beacon tag 10 moves through Exit mZone3, it is also read by the mZone transmitter 100 at mZone3. In this case, the beacon tag 10 would transmit a beacon signal 32 where: (1) current mZone ID 750 would be 'mZone3'; and (2) previous mZone ID 760 would be 'Exit mZone2.' If the asset hosting beacon tag 10 moves out through the door at Exit mZone2, then beacon tag 10 would transmit a beacon signal 32 where: (1) current mZone ID 750 would be 'none'; and (2) previous mZone ID 760 would be 'Exit mZone2.' In this instance, the logic in server database 230 may determine that the asset hosting beacon tag 10 is no longer in the monitored area of the hospital wing.

If instead the asset hosting the beacon tag 10 were located between the mZone transmitters 100 at mZone2 and mZone3, then beacon tag 10 would transmit a beacon signal 32 where either: (1) current mZone ID 750 would be 'none,' and previous mZone ID 760 would be 'mZone3'; or (2) current mZone ID 750 would be 'none,' and previous mZone ID 760 would be 'mZone2.' The ambiguity of moving from mZone2 to either the left or right interstitial spaces before either mZone1 or mZone3 can be resolved by server database 230 notifying a user to check in both locations. Additionally, or alternatively, the relative signal strength of the mZone signal 142 transmitted by each of the mZone transmitters 100 may be used to determine which mZone transmitter 100 is closer, providing finer detail on the location of beacon tag 10 and its attendant asset. Using similar logic on server database 230, the location of assets tagged with beacon tags 10 can be determined to be within a given mZone or between two mZones; thus, complete coverage of an area with mZone transmitters 100 may not be required in all cases. The location resolution can be resolved to smaller areas, if desired, by reducing the transmit range of the mZone transmitters 100 and/or disposing additional mZone transmitters 100 at more locations. Also, as previously discussed, a given mZone transmitter 100 may include an antenna 141 having directional transmission capabilities. In the example context of a hospital, it may be desirable to ensure that the transmission range of a given mZone transmitter 100 is limited to a single floor of the hospital. Otherwise, the signals output by mZone transmitter 100 might penetrate to multiple floors, resulting in ambiguity and confusion in determining location.

In accordance with some embodiments, system 1000 may be utilized in tracking assets, such as shipping containers and chassis, at a seaport or shipping facility. FIG. 7A illustrates a side elevation view of a trailer 300 having a beacon tag 10 mounted to its chassis 302 below a. shipping container 306, in accordance with an embodiment of the present disclosure. FIG. 7B illustrates a top-down plan view of the chassis 302 of FIG. 7A having a beacon tag 10 mounted thereto, in accordance with an embodiment of the present disclosure. FIG. 8 illustrates a partial cross-section view of a beacon tag 10 mounted on an I-beam 304 of a chassis 302 below a shipping container 306, in accordance with an embodiment of the present disclosure.

As can be seen from these figures, beacon tag 10 may be mounted to an I-beam 304 of chassis 302 using any suitable means, such as magnet 25 (previously discussed). In an example case, beacon tag 10 may be mounted on the underside of a longitudinal I-beam 304 of the host chassis 302, below the surface on which shipping container 306 will rest. The distance ($D_1$) between shipping container sensor 95 and the edge of I-beam 304 may be customized, as desired for a given target application or end-use, and in at least some cases may be minimized in a manner which avoids confusion which otherwise would arise from erroneous detection of the presence of I-beam 304. In some cases, $D_1$ may be in the range of about 1-3 inches (e.g., about 1-2 inches, about 2-3 inches, or any other sub-range in the range of about 1-3 inches). In sonic other cases, $D_1$ may be in the range of about 1 inch or less (e.g., about 0.75 inches or less, about 0.5 inches or less, about 0.25 inches or less, and so forth). In some other cases, $D_1$ may be in the range of about 3 inches or more (e.g., about 4 inches or more, about 5 inches or more, and so forth).

The distance ($D_2$) at which shipping container sensor 95 may detect the presence of shipping container 306 on chassis 302 may be customized, as desired for a given target application or end-use. In some cases, $D_2$ may be in the range of about 1-6 inches (e.g., about 1-3 inches, about 3-6 inches, or any other sub-range in the range of about 1-6 inches). In some other cases, $D_2$ may be in the range of about 1 inch or less (e.g., about 0.75 inches or less, about 0.5 inches or less, about 0.25 inches or less, and so forth). In some still other cases, $D_2$ may be in the range of about 6 inches or more (e.g., about 7 inches or more, about 8 inches or more, and so forth). As will he appreciated in light of this disclosure, the mounting location of beacon tag 10 is not intended to be limited only to the example location depicted in these figures, as beacon tag 10 may be mounted anywhere on chassis 302 sufficient to be able to detect the presence or absence of a shipping container 306, in accordance with other embodiments.

Beacon tag 10 may transmit a beacon signal 32 including a data packet 700 including data in its Status 740 field pertaining to the presence or absence of a shipping container 306. In tracking a shipping container 306, the Group ID 720 data field and Sub-Group ID 730 data field of beacon signal 32 may be used to identify the owner of a given chassis 302 hosting a beacon tag 10 of interest. In tracking a shipping container 306, the Status 750 data field of beacon signal 32 may include data pertaining to the current or most recent status (e.g., the presence or absence) of a shipping container 306 of interest with respect to chassis 302 of interest.

Figure 9:
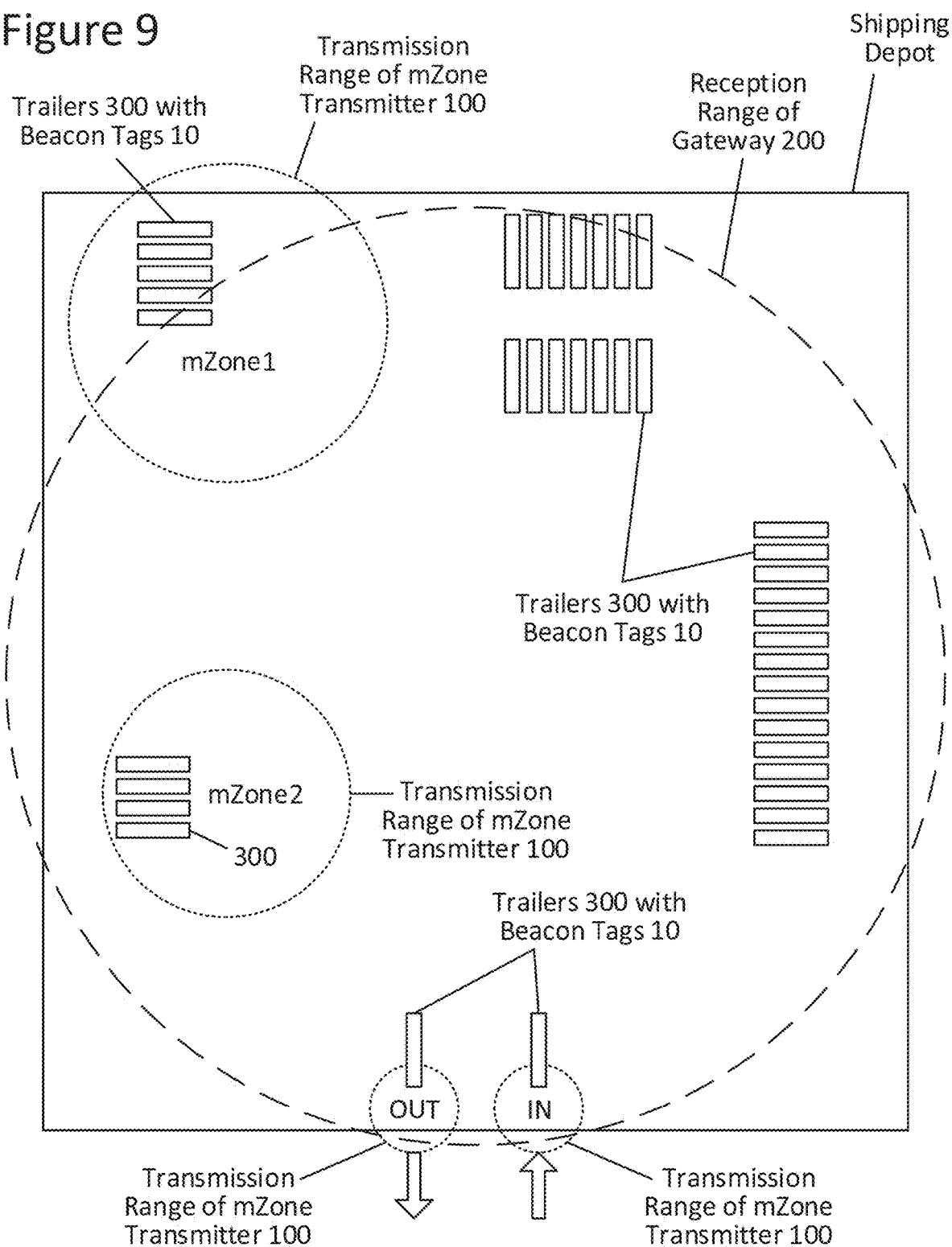
FIG. 9 is a top-down plan view of a shipping depot illustrating an example case of using a wireless tracking system to track trailers, in accordance with an embodiment of the present disclosure.

FIG. 9 is a top-down plan view of a shipping depot illustrating an example case of using system 1000 to track trailers 300, in accordance with an embodiment of the present disclosure. in this example case, there are four mZone transmitters 100, labeled mZone1, mZone2, IN, and OUT, and a single gateway 200 located to read all beacon tags 10 hosted by trailers 300. in this example, mZone1 may be at a repair area, and mZone2 may be at an inspection area. Using the mZones in this manner may provide information on how long a chassis 302 may be in repair or idle/lout-of-service. Using the IN and OUT mZones at the gates may provide information to server database 230 as to when a given chassis 302 arrive or leaves the facility. This can facilitate monitoring a chassis 302 of interest for purposes of billing the customer renting that chassis 302. Although system 1000 may not track a chassis 302 once it leaves the shipping depot, the current GPS location of the chassis 302 may be provided via a smartphone or other computing device on-board the trailer 300, and that information may be relayed to server database 230.

Moreover, shipping container sensor 95 may provide information regarding whether a given chassis 302 is being used to move shipping containers 306 around within the facility so it can be billed. In accordance with some embodiments, the business intelligence for billing purposes may be built into software analyzing server database 230. Because all chassis 302 are logged out of the shipping depot by their truck drivers, the use of the chassis 302 can be billed intelligently.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A wireless tracking system comprising:
 a micro-zone transmitter device configured to transmit a first signal including data pertaining to a unique identifier associated with the micro-zone transmitter device, wherein the first signal is of a frequency in at least one of:
  a 902 MHz ISM band;
  a 915 MHz ISM band;
  an 869 MHz ISM band; and
  a 433 MHz ISM band; and
 a beacon tag device comprising:
  a wireless receiver configured to receive the first signal including the data pertaining to the unique identifier associated with the micro-zone transmitter device;
  a wireless transmitter configured to transmit a second signal of a frequency in an ISM band of between 2.4-2.485 GHz, wherein the second signal includes:
   data pertaining to a unique identifier associated with the beacon tag device; and
   the data pertaining to the unique identifier associated with the micro-zone transmitter device; and
  a motion detection sensor configured to detect at least one of movement of the beacon tag device and an impact to the beacon tag device and, in response thereto, output a wake-up signal causing the wireless transmitter to transmit the second signal external to the beacon tag device;
  wherein the beacon tag device is configured to be physically hosted by and paired with a mobile asset of interest such that the asset is able to be wirelessly tracked utilizing a computing device external to and in wireless communication with the beacon tag device.

2. The wireless tracking system of claim 1, wherein the micro-zone transmitter device is further configured to:
 receive a third signal from a remote source, wherein the third signal is of a frequency in an ISM band of between 2.4-2.485 GHz; and transmit a fourth signal in response to receipt of the third
   signal, wherein the fourth signal:
   is of a frequency in at least one of:
      a 902 MHz ISM band;
      a 915 MHz ISM band;
      an 869 MHz ISM band; and
      a 433 MHz ISM band; and
   includes:
      a command; and
      at least one of:
         data pertaining to the unique identifier associated
            with the beacon tag device; and
         data pertaining to at least one of a group identifier
            and a sub-group identifier associated with the
            beacon tag device.

3. The wireless tracking system of claim 2, wherein:
   the command is either a location command, a find command, or an alert command; and
   if the command is the find command, the wireless transmitter of the beacon tag device is further configured to transmit the second signal at least one of at an increased transmission rate and at an increased transmission power in response to the beacon tag device being a target of the find command.

4. The wireless tracking system of claim 2, wherein:
   the beacon tag device further comprises at least one of:
      an audio output device configured to emit a sound; and
      an optical output device configured to emit light;
   the command is either a location command, a find command, or an alert command; and
   if the command is the find command, the beacon tag device is configured to at least one of:
      emit the sound via the audio output device in response to the beacon tag device being a target of the find command; and
      emit light via the optical output device in response to the beacon tag device being a target of the find command.

5. The wireless tracking system of claim 1, wherein the second signal further includes data pertaining to at least one of a group identifier and a sub-group identifier associated with the beacon tag device.

6. The wireless tracking system of claim 1, wherein the second signal further includes data pertaining to at least one of:
   a status of the beacon tag device;
   a power level of a power supply of the beacon tag device; and
   an output of a sensor of the beacon tag device.

7. The wireless tracking system of claim 1, further comprising a gateway configured to communicate with:
   the micro-zone transmitter device;
   the beacon tag device; and
   a server database.

8. A beacon tag device comprising:
   a wireless receiver configured to receive a first signal including data pertaining to a unique identifier associated with a remote source of the first signal;
   a wireless transmitter configured to transmit a second signal of a frequency in an ISM band of between 2.4-2.485 GHz, wherein the second signal includes data pertaining to a unique identifier associated with the beacon tag device;
   a processor configured to instruct the wireless transmitter to transmit in the second signal the data pertaining to the unique identifier associated with the remote source of the first signal; and
   a motion detection sensor configured to detect at least one of movement of the beacon tag device and an impact to the beacon tag device and, in response thereto, output a wake-up signal to the processor, the wake-up signal causing the processor to transition out of a sleep-state or an off-state, wherein the processor is configured to instruct the wireless transmitter to transmit the second signal in response to receipt of the wake-up signal;
   wherein the beacon tag device is configured to be physically hosted by and paired with a mobile asset of interest such that the asset is able to be wirelessly tracked utilizing a computing device external to and in wireless communication with the beacon tag device.

9. The beacon tag device of claim 8, wherein the first signal is of a frequency in at least one of:
   a 902 MHz ISM band;
   a 915 MHz ISM band;
   an 869 MHz ISM band; and
   a 433 MHz ISM band.

10. The beacon tag device of claim 8, wherein the wireless receiver is configured to be, within a one-second period:
   turned on and able to receive the first signal for a first period of 1 ms or less; and
   turned off and unable to receive the first signal for a second period of 100 ms or less.

11. The beacon tag device of claim 8, wherein the wireless receiver is further configured to receive a third signal including:
   a command; and
   at least one of:
      data pertaining to a unique identifier associated with the beacon tag device; and
      data pertaining to at least one of a group identifier and a sub-group identifier associated with the beacon tag device.

12. The beacon tag device of claim 11, wherein:
   the command is either a location command, a find command, or an alert command; and
   if the command is the find command, the processor is further configured to instruct the wireless transmitter to transmit the second signal at least one of at an increased transmission rate and at an increased transmission power in response to the beacon tag device being a target of the find command or the alert command.

13. The beacon tag device of claim 11, wherein:
   the beacon tag device further comprises at least one of:
      an audio output device configured to emit a sound; and
      an optical output device configured to emit light;
   the command is either a location command, a find command, or an alert command; and
   if the command is the find command, the processor is further configured to at least one of:
      instruct the audio output device to emit the sound in response to the beacon tag device being a target of the find command or the alert command; and
      instruct the optical output device to emit light in response to the beacon tag device being a target of the find command or the alert command.

14. The beacon tag device of claim 8, wherein the second signal further includes data pertaining to at least one of a group identifier and a sub-group identifier associated with the beacon tag device.

15. The beacon tag device of claim 8, wherein the second signal further includes data pertaining to at least one of:
   a status of the beacon tag device;
   a power level of a power supply of the beacon tag device; and an output of a sensor of the beacon tag device.

16. The beacon tag device of claim 8, wherein:
the wireless receiver is further configured to receive a third signal including data pertaining to a unique identifier associated with a remote source of the third signal; and
the processor is further configured to instruct the wireless transmitter to transmit in the second signal the data pertaining to the unique identifier associated with the remote source of the third signal.

17. The beacon tag device of claim 8, wherein:
the beacon tag device further comprises a temperature sensor configured to detect at least one of:
   an ambient temperature surrounding the beacon tag device; and
   a temperature of an asset hosting the beacon tag device; and
the second signal further includes data pertaining to at least one of:
   the ambient temperature surrounding the beacon tag device; and
   the temperature of the asset hosting the beacon tag device.

18. The beacon tag device of claim 8, wherein:
the beacon tag device further comprises a sensor configured to detect a presence of a shipping container disposed on a chassis hosting the beacon tag device; and
the second signal further includes data pertaining to whether the shipping container is disposed on the chassis.

19. The beacon tag device of claim 8, wherein:
the beacon tag device further comprises a removal detection sensor configured to detect removal of the beacon tag device from a host asset; and
the second signal further includes data pertaining to whether the beacon tag device has been removed from the host asset.

20. The beacon tag device of claim 8, further comprising at least one of:
   a near-field communication (NFC) device configured to communicate with the processor and at least one of transmit and receive an NFC signal; and
   a radio frequency identification (RFID) device configured to communicate with the processor and at least one of transmit and receive an RFID signal.

\* \* \* \* \*